US008925624B2

(12) United States Patent
Kuroyanagi et al.

(10) Patent No.: US 8,925,624 B2
(45) Date of Patent: Jan. 6, 2015

(54) EXHAUST HEAT EXCHANGER

(75) Inventors: Isao Kuroyanagi, Anjo (JP); Takayuki Hayashi, Nagoya (JP); Yasutoshi Yamanaka, Kariya (JP); Yuuhei Kunikata, Kariya (JP); Takeshi Iguchi, Gifu (JP); Ryoichi Sanada, Obu (JP); Kenji Yamada, Okazaki (JP); Takao Ikeda, Okazaki (JP)

(73) Assignee: Denso Corporation, Kariya (JP)

( * ) Notice: Subject to any disclaimer, the term of this patent is extended or adjusted under 35 U.S.C. 154(b) by 928 days.

(21) Appl. No.: 13/065,983

(22) Filed: Apr. 4, 2011

(65) Prior Publication Data
US 2011/0247318 A1 Oct. 13, 2011

(30) Foreign Application Priority Data

Apr. 9, 2010 (JP) .................................. 2010-90829
Feb. 7, 2011 (JP) .................................. 2011-24339

(51) Int. Cl.
*F28F 9/02* (2006.01)
*F02M 25/07* (2006.01)
*F28D 7/16* (2006.01)
*F28D 21/00* (2006.01)

(52) U.S. Cl.
CPC ......... *F02M 25/0737* (2013.01); *F28D 7/1692* (2013.01); *F28F 9/026* (2013.01); *F28D 21/0003* (2013.01); *Y02T 10/121* (2013.01); *F28F 2009/029* (2013.01); *F28F 2265/26* (2013.01)
USPC ......................................... 165/157; 165/166

(58) Field of Classification Search
CPC ... F28D 9/0031; F28D 9/0037; F28D 9/0068; F28D 9/0006; F28D 21/0003; F28D 2021/008
USPC ............................... 165/134.1, 157, 165, 166
See application file for complete search history.

(56) References Cited

U.S. PATENT DOCUMENTS

| 2,428,066 | A | * | 9/1947 | Ellis ............................... 165/166 |
| 4,685,292 | A | * | 8/1987 | Brigham et al. ................. 60/320 |
| 4,768,584 | A | * | 9/1988 | Kehrer et al. .................. 165/140 |
| 5,573,060 | A | * | 11/1996 | Adderley et al. ............. 165/166 |

(Continued)

FOREIGN PATENT DOCUMENTS

| JP | 03-056088 | 5/1991 |
| JP | 4-032692 | 2/1992 |

(Continued)

OTHER PUBLICATIONS

Office Action dated Dec. 17, 2013, in corresponding Japanese Application No. 2011-024339.

(Continued)

*Primary Examiner* — Allen Flanigan
(74) *Attorney, Agent, or Firm* — Harness, Dickey & Pierce, PLC

(57) ABSTRACT

An exhaust heat exchanger includes a water tank accommodating tubes and having an outside space defined outside of the tubes, a gas tank having an exhaust passage and an outside space defined outside of the exhaust passage, a dividing portion to separate the outside space of the water tank from the exhaust passage of the gas tank, and a communication portion. The outside space of the gas tank and the outside space of the water tank communicate with each other through the communication portion.

24 Claims, 18 Drawing Sheets

(56) References Cited

U.S. PATENT DOCUMENTS

| | | | |
|---|---|---|---|
| 7,077,190 B2 | 7/2006 | Hayashi et al. | |
| 7,631,688 B2 * | 12/2009 | Brost et al. | 165/166 |
| 7,984,753 B2 * | 7/2011 | Ohfune et al. | 165/166 |
| 2006/0219394 A1 * | 10/2006 | Martin et al. | 165/157 |
| 2007/0193732 A1 * | 8/2007 | Oofune et al. | 165/164 |
| 2008/0135221 A1 * | 6/2008 | Nakamura | 165/165 |
| 2008/0202724 A1 * | 8/2008 | Lorenz et al. | 165/51 |
| 2009/0090486 A1 * | 4/2009 | Geskes et al. | 165/51 |
| 2010/0255845 A1 | 10/2010 | Kitaji | |
| 2011/0185714 A1 * | 8/2011 | Lohbreyer et al. | 60/320 |

FOREIGN PATENT DOCUMENTS

| | | | |
|---|---|---|---|
| JP | 11-036995 | 2/1999 | |
| JP | 11-303689 | 11/1999 | |
| JP | 11-325789 | 11/1999 | |
| JP | 2003-090693 | 3/2003 | |
| JP | 2003-106785 | 4/2003 | |
| JP | 2004-116913 | 4/2004 | |
| JP | 2004116913 A * | 4/2004 | F28F 9/02 |
| JP | 2007-232355 | 9/2007 | |
| JP | 2008-275244 | 11/2008 | |
| JP | 2010-190064 | 9/2010 | |
| JP | 2010-249426 | 11/2010 | |

OTHER PUBLICATIONS

Office Action mailed Jun. 19, 2012 in corresponding Japanese Application No. 2010-099100 (with English translation).
Information Statement, Mar. 4, 2013, in corresponding Japanese Application No. 2011-024339.
Office Action dated May 22, 2014 in the related Chinese application No. 201210348101.9 with English translation.
Office Action mailed Sep. 24, 2013 in the related Japanese application No. 2011-208299 with English translation.
Office Action mailed Jan. 28, 2014 in the related Japanese application No. 2011-208299 with English translation.

* cited by examiner

EXHAUST HEAT EXCHANGER

CROSS REFERENCE TO RELATED APPLICATION

This application is based on Japanese Patent Application No. 2010-90829 filed on Apr. 9, 2010 and Japanese Patent Application No. 2011-24339 filed on Feb. 7, 2011, the disclosures of which are incorporated herein by reference in their entirety.

BACKGROUND OF THE INVENTION

1. Field of the Invention

The present invention relates to an exhaust heat exchanger.

2. Description of Related Art

JP-A-2003-106785 discloses an exhaust heat exchanger having a water tank, tubes arranged in the water tank, an inlet gas tank, an outlet gas tank, and a flange. The tube defines a passage of exhaust gas recirculation (EGR) gas. EGR gas is recirculated into an engine after exhausted from the engine. The tube has an inner fin inside of the passage. The inlet gas tank is connected to an end of the water tank, and distributes EGR gas into the tubes. The outlet gas tank is connected to the other end of the water tank, and gathers EGR gas flowing out of the tubes. The flange is fixed to each of the gas tanks, and an EGR gas pipe is connected to the flange. An inlet water pipe is connected to the water tank, and cooling water flows into the water tank through the inlet water pipe. An outlet water pipe is connected to the water tank, and cooling water flows out of the water tank through the outlet water pipe. A core plate is arranged at longitudinal ends of the tubes, so that inside of the water tank and inside of the gas tank are separated from each other by the core plate. EGR gas passing through the tube is cooled by cooling water flowing outside of the tubes in the water tank.

The tubes, the fins, the gas tanks, the flange, the water pipes and the core plate are all made of stainless steel, and are integrally brazed with each other.

Aluminum is widely used as a material for producing a heat exchanger, and is light and cheap compared with stainless steel. Further, brazing property of aluminum is better than that of stainless steel. However, heat resisting property of aluminum is lower than that of stainless steel.

A temperature of EGR gas is high at an inlet side of the heat exchanger. Therefore, mechanical connection strength between the flange and the EGR gas pipe is easily lowered, and strength of the inlet gas tank may not be secured. Further, difference of thermal expansion is generated between the inlet gas tank and the water tank, because a temperature difference is generated between the inlet gas tank that is exposed to hot EGR gas and the water tank that is exposed to cold cooling water. Thermal expansion coefficient of aluminum is larger than that of stainless steel. Therefore, thermal stress generated at a connection between the inlet gas tank and the water tank is large when the heat exchanger is made of aluminum, compared with a case where the heat exchanger is made of stainless steel. That is, if the heat exchanger is produced with a material having a low heat resisting property, temperature lowering is necessary for the inlet gas tank and the flange.

SUMMARY OF THE INVENTION

In view of the foregoing and other problems, it is an object of the present invention to provide an exhaust heat exchanger.

According to an example of the present invention, an exhaust heat exchanger includes a tube, a water tank, a gas tank, a flange, a dividing portion and a communication portion. Gas exhausted from an engine passes through the tube. The water tank accommodates the tube, and has an outside space located outside of the tube. The gas tank has dual structure of an exhaust passage and an outside space. The exhaust gas passes through the exhaust passage, and the outside space is located outside of the exhaust passage. The exhaust passage has an inlet part and an outlet part connected to an inlet part of the water tank. The flange is fixed to the inlet part of the gas tank. An exhaust pipe of the engine is to be connected to the flange. Heat is exchanged between cooling fluid passing through the outside space of the water tank and exhaust gas passing through the tube. The dividing portion separates the outside space of the water tank from the exhaust passage of the gas tank. The exhaust passage communicates with inside of the tube through the dividing portion. The outside space of the gas tank and the outside space of the water tank communicate with each other through the communication portion.

Accordingly, the exhaust heat exchanger can be produced with a material having a low heat resisting property.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

In a first embodiment, an exhaust heat exchanger is a gas cooler 100A used for an exhaust gas recirculation (EGR) apparatus of a diesel or gaoline engine, for example.

Figure 1:
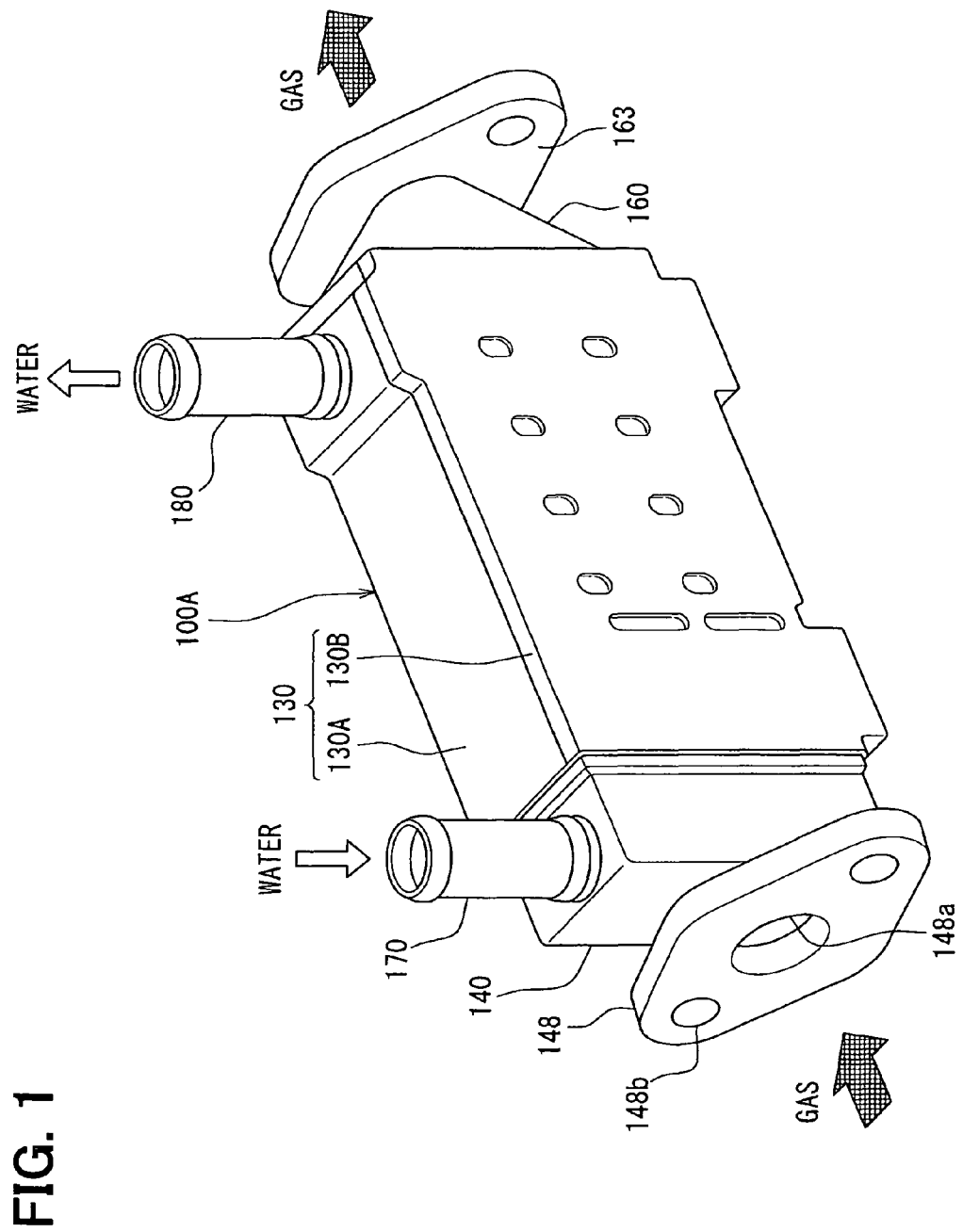
FIG. 1 is a perspective view illustrating an EGR gas cooler according to a first embodiment.
Figure 2:
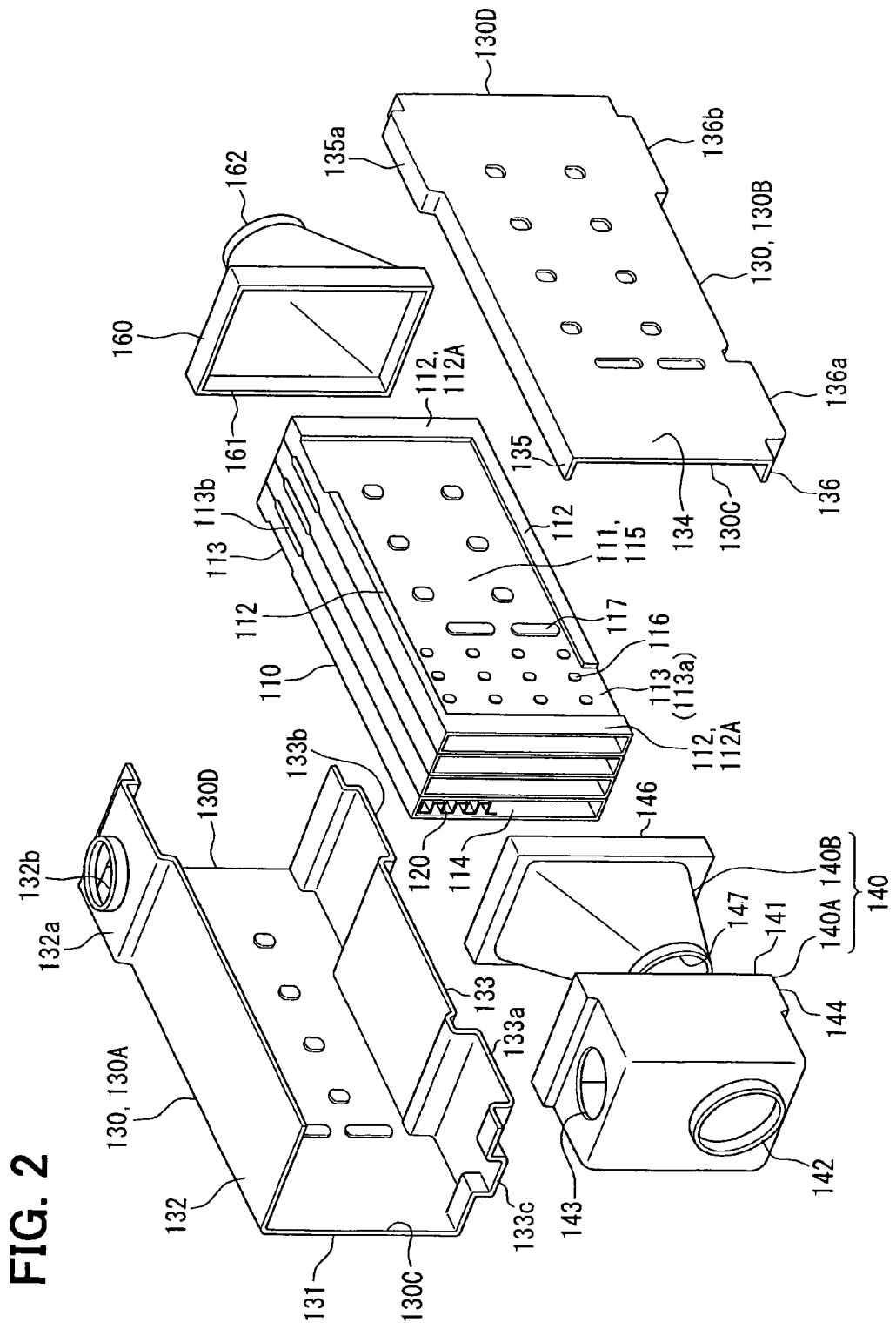
FIG. 2 is an exploded view illustrating the EGR gas cooler.
Figure 3:
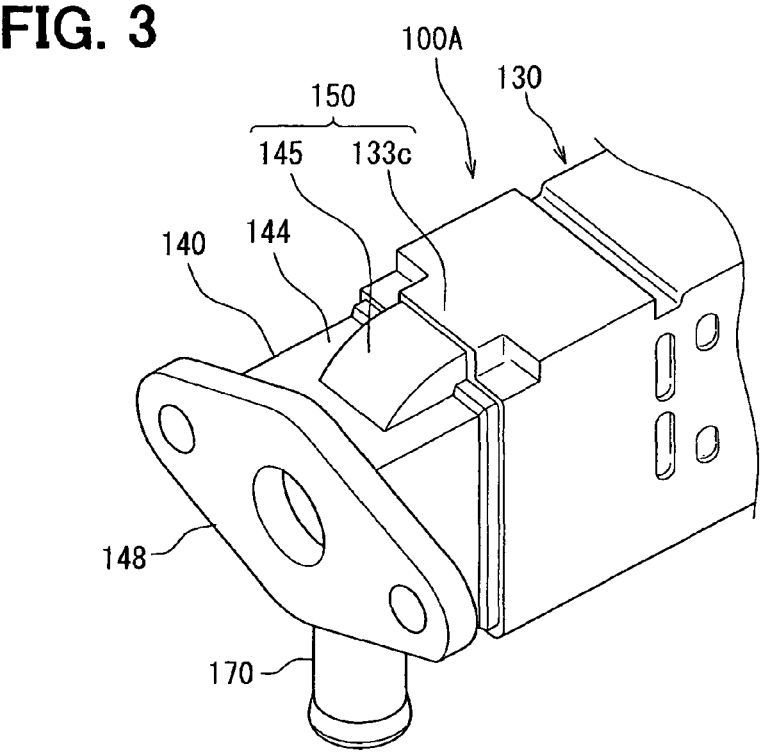
FIG. 3 is a perspective view illustrating a lower side of the EGR gas cooler.
Figure 4:
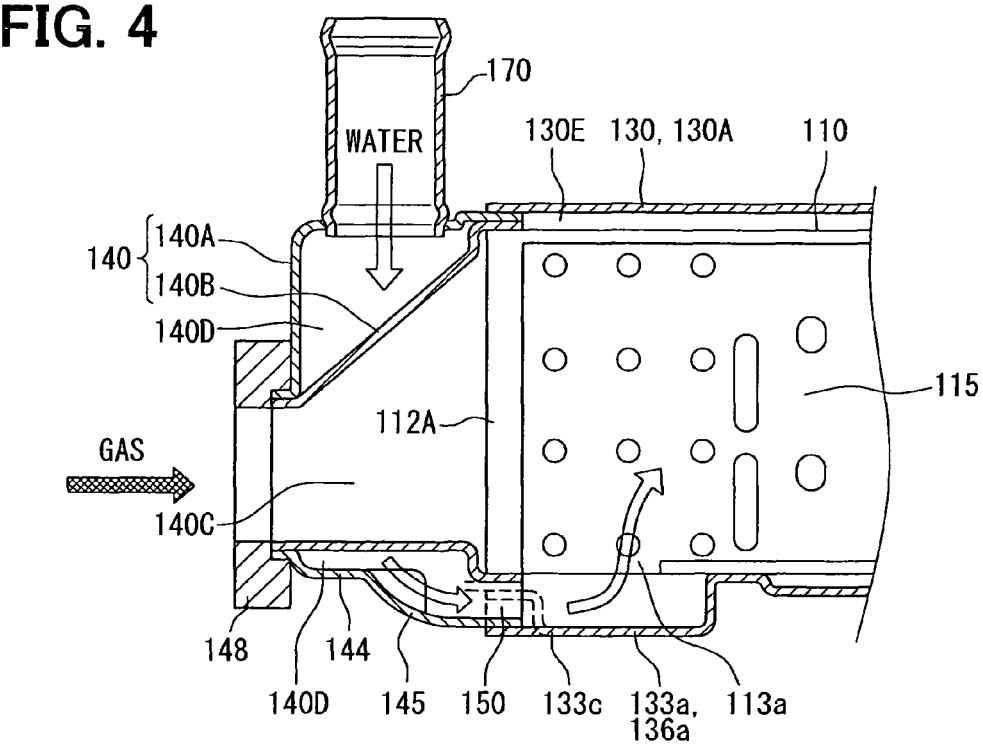
FIG. 4 is a cross-sectional view illustrating the EGR gas cooler.

FIG. 1 is a perspective view illustrating the gas cooler 100A, and FIG. 2 is an exploded view of FIG. 1. FIG. 3 is a perspective view illustrating a lower side of the gas cooler 100A by reversing an upside of FIG. 1 down. FIG. 4 is a cross-sectional view of the gas cooler 100A. Definitions of up and down are used only for easy understanding, and are not limited in a real situation.

The gas cooler 100A cools exhaust gas to be recirculated into an intake side of the engine using water for cooling the engine. The cooling water may correspond to cooling fluid. As shown in FIG. 2, the gas cooler 100A includes tubes 110, inner fins 120 respectively arranged inside of the tubes 110, a water tank 130, an inlet gas tank 140, and an outlet gas tank 160. Further, as shown in FIG. 1, the gas cooler 100A includes an inlet water pipe 170 and an outlet water pipe 180. The gas cooler 100A is made of aluminum material or aluminum alloy, which is light, cheap and excellent in heat conductivity, and is produced by brazing or welding the above components 110, 120, 130, 140, 160, 170, 180 with each other.

The tube 110 is a pipe component through which exhaust gas passes, and is constructed by two tube plates (not shown). The tube plate has a shallow U-shape cross-section produced by press working or roll processing a flat member. Open sides of the plates are connected with each other, so that the tube 110 has a flat rectangular cross-section. The inner fin 120 has a wave shape by press working a thin plate, and is arranged inside of the tube 110. The inner fin 120 is joined to an inner base face 111 of the tube 110. The inner fin 120 is interposed between the tube plates when the tube 110 is produced.

The tubes 110 are layered with each other in a tube layering direction in a manner that the base faces 111 of the tubes 110 oppose to each other. As shown in FIG. 2, a gas passage 114 is defined inside of the tube 110, and a water passage 115 is defined outside of the tube 110. Exhaust gas passes through the gas passage 114, and cooling water flows through the water passage 115.

The base face 111 has a projection 112 and a recess 113. The projection 112 protruding from the base face 111 outward is formed by press working. The projection 112 extends around an outer periphery of the base face 111 like a weir. The recess 113 is recessed from the projection 112 to the base face 111. That is, the recess 113 is a flat part not having the projection 112, and is arranged in a part of the outer periphery of the base face 111. Specifically, the recess 113 is located at two diagonal corner positions of the base face 111. For example, the recess 113 is defined at a left-and-lower position and a right-and-upper position in FIG. 2. The tubes 110 are layered in a manner that the projections 112 are contact with each other, and the contact projections 112 are joined with each other.

A divider 112A is formed by connecting the projections 112 in the tube layering direction. The connected projections 112 are located at each end of the tube 110 in a tube longitudinal direction. The divider 112A separates the water passage 115 inside of the water tank 130 from the gas tank 140, 160.

A space is defined inside of the projection 112 located between the tubes 110, and the water passage 115 is defined by the space. As shown in FIG. 2, the recess 113 located on the left-and-lower position is an inlet opening 113a through which cooling water flows into the water passage 115. The recess 113 located on the right-and-upper position is an outlet opening 113b through which cooling water flows out of the water passage 115. The inlet opening 113a is located adjacent to an inlet side of the gas passage 114, and the outlet opening 113b is located opposite from the inlet opening 113a in the tube longitudinal direction.

The base face 111 has plural dimples 116 located adjacent to the inlet opening 113a as a temperature decreasing portion that lowers a temperature of a temperature boundary layer of cooling water on an outer surface of the tube 110. The dimples 116 may correspond to a protruding portion. The dimple 116 has a cylinder shape, and a protruding dimension of the dimple 116 is set equal to that of the projection 112. The dimples 116 are arranged in a grid or array pattern, for example.

A rectifier 117 is defined on the base face 111 and located adjacent to the inlet opening 113a, so that a flow of cooling water is expanded as much as possible to the whole of the base face 111 before reaching the outlet opening 113b. The rectifier 117 also protrudes from the base face 111, similar to the dimple 116.

The water tank 130 is a container which accommodates the layered tubes 110, and has a first tank 130A and a second tank 130B.

As shown in FIG. 2, the first tank 130A has a main part 131, an upper part 132 and a lower part 133, so that the first tank 130A has a U-shaped cross-section as a whole. The main part 131 opposes to the base face 111. The upper part 132 is formed by bending an upper end of the main part 131 by approximately 90° toward the tube 110. The lower part 133 is formed by bending a lower end of the main part 131 by approximately 90° toward the tube 110. An end portion of the upper part 132 in the tube longitudinal direction corresponds to the outlet opening 113b, and has an expansion 132a expanded upward. A pipe hole 132b is defined in the expansion 132a, and the pipe 180 is to be connected to a burring edge of the pipe hole 132b. End portions of the lower part 133 in the tube longitudinal direction have expansions 133a, 133b, respectively, expanded downward.

The second tank 130B has a main part 134, an upper part 135 and a lower part 136, so that the second tank 130B has a U-shaped cross-section shallower than that of the first tank 130A. The main part 134 opposes to the base face 111. The upper part 135 is formed by bending an upper end of the main part 134 by approximately 90° toward the tube 110. The lower part 136 is formed by bending a lower end of the main part 134 by approximately 90° toward the tube 110. An end portion of the upper part 135 in the tube longitudinal direction corresponds to the outlet opening 113b, and has an expansion 135a expanded upward. End portions of the lower part 136 in the tube longitudinal direction have expansions 136a, 136b, respectively, expanded downward, similar to the first tank 130A.

An open side of the first tank 130A and an open side of the second tank 130B are connected with each other, so that the water tank 130 has a tube shape with a rectangular cross-section. Ends of the water tank 130 in the tube longitudinal direction are defined as opens ends 130C, 130D, respectively, that opens to outside. The open end 130C opposing to the inlet gas tank 140 has an expansion 133c as a water tank expansion. The open end 130C has a rectangular shape, and the expansion 133c is located on a lower side of the open end 130C and is located at center in the tube layering direction. The expansion 133c is expanded downward from the lower side, and is connected to the expansion 133a.

Gas flowing from an exhaust pipe of the engine passes through the inlet gas tank 140. As shown in FIG. 4, the gas tank 140 defines an exhaust passage 140C to distribute gas into the tubes 110. The inlet gas tank 140 has dual structure of an outside tank 140A and an inside tank 140B.

As shown in FIG. 2, the outside tank 140A has a rectangular-parallelepiped outer shape, and a face of the outside tank 140A opposing to the tube 110 is open. The open face is an opening 141 having a rectangular shape. A face of the outside tank 140A opposite from the opening 141 has a circular flange hole 142, and the flange hole 142 is located on a lower side of the opposite face. The flange hole 142 has a burring to which a flange 148 is connected, as shown in FIG. 1. Further, the water pipe 170 is connected to an upper face of the outside tank 140A through a pipe hole 143 defined in the upper face, as shown in FIG. 2.

As shown in FIG. 3, an outer wall 144 of the outside tank 140A located on the lower side has an expansion 145 as a gas tank expansion. The expansion 145 is located on a lower side of the rectangular opening 141, and is located at center in the tube layering direction. The expansion 145 is expanded downward from the lower side, and an expansion amount of the expansion 145 becomes smaller toward the flange hole 142. The outer wall 144 having the expansion 145 is a lower face of the outside tank 140A, and the lower face is located opposite from an upper face having the pipe hole 143.

As shown in FIG. 2, the inside tank 140B has a funnel shape, and the exhaust passage 140C is defined inside of the inside tank 140B. The inside tank 140B has a rectangular opening 146 on a face opposing to the tube 110, and a face of the inside tank 140B opposite from the rectangular opening 146 has a circular flange hole 147. The hole 147 has a burring to which the flange 148 is connected. The opening 146 may correspond to a first opening part, and the flange hole 147 may correspond to a second opening part. The second opening part opens in a direction corresponding to an axis of the first opening part.

The inside tank 140B is disposed inside of the outside tank 140A. An outer periphery of the opening 146 is joined to an inner periphery of the opening 141 except the projection 145. Further, an outer periphery of the burring of the flange hole 147 is joined to an inner periphery of the burring of the flange hole 142. Due to the dual structure, as shown in FIG. 4, the gas tank 140 has an outside space 140D located outside of the exhaust passage 140C. That is, the outside space 140D is defined between the inside tank 140B and the outside tank 140A. The outside space 140D communicates with outside of the gas tank 140 through the expansion 145.

The flange 148 is connected to the gas tank 140, and an exhaust pipe of the EGR apparatus is to be connected to the flange 148. As shown in FIG. 1, the flange 148 is a board member having a lozenge shape. A communication hole 148a is defined at a central part of the flange 148. Moreover, a bolt hole 148b is defined each side of the communication hole 148a, and has an internal thread to which a bolt is inserted. The flange 148 is connected to the gas tank 140 in a manner that the communication hole 148a communicates with the hole 142, 147 of the gas tank 140. An inner periphery of the opening 146 of the gas tank 140 is connected to an outer periphery of the divider 112A of the layered tubes 110, so that the exhaust passage 140C communicates with each of the gas passages 114 of the tubes 110.

As shown in FIG. 2, the outlet gas tank 160 has a funnel shape, and an exhaust passage is defined inside of the gas tank 160. The gas tank 160 has a rectangular opening 161 on a face opposing to the tube 110, and a face of the tank 160 opposite from the opening 161 has a circular flange hole 162. The hole 162 has a burring to which a flange 163 is connected, as shown in FIG. 1. The flange 163 is connected to the gas tank 160, and an exhaust pipe of the EGR apparatus is to be connected to the flange 163. The flange 163 is a board member having a lozenge shape. A communication hole is defined at a central part of the flange 163. Moreover, a bolt hole is defined each side of the communication hole, and has an internal thread to which a bolt is inserted. The flange 163 is connected to the gas tank 160 in a manner that the communication hole communicates with the flange hole 162 of the gas tank 160. An inner periphery of the opening 161 of the gas tank 160 is connected to an outer periphery of the divider 112A of the layered tubes 110, so that the exhaust passage inside of the tank 160 communicates with each of the gas passages 114 of the tubes 110.

The first water tank 130A and the second water tank 130B are assembled to cover outside of the layered tubes 110 in the tube layering direction. That is, the tubes 110 are accommodated in the water tank 130 constructed by the tanks 130A, 130B. An inner periphery of the open end 130C of the water tank 130 is connected to an outer periphery of the opening 141 of the inlet gas tank 140, and an inner periphery of the open end 130D of the water tank 130 is connected to an outer periphery of the opening 161 of the outlet gas tank 160.

As shown in FIG. 4, a space defined by the expansion 133a, 136a of the water tank 130 communicates with the inlet opening 113a located on a side face of the layered tubes 110. A space defined by the expansion 132a, 135a of the water tank 130 communicates with the outlet opening 113b located on the side face of the layered tubes 110. A space is defined between the side face of the layered tubes 110 and the expansion 133b, 136b. A water passage 115 is defined between the base face 111 of the most outside tube 110 and the main part 131, 134 of the tank 130A, 130B, and is similar to the water passage 115 defined between the tubes 110. A clearance is defined between an upper face of the tube 110 and the upper part 132, 135, and a clearance is defined between a lower face of the tube 110 and the lower part 133, 136. The water tank 130 has an outside space 130E located outside of the tubes 110.

As shown in FIG. 4, an inner periphery of the projection 133c of the water tank 130 is joined to an outer periphery of the projection 145 of the inlet gas tank 140, so that the expansion 133c and the expansion 145 are connected with each other. A water passage defined inside of the expansion 133c, 145 corresponds to a communication portion 150. Due to the communication portion 150, a space defined in the projection 133a, 136a of the water tank 130 communicates with the outside space 140D of the gas tank 140.

Cooling water flows into the water pipe 170 from the engine. A tip end of the pipe 170 is inserted and connected to the pipe hole 143 of the outside tank 140A. The pipe 170 communicates with the outside space 140D of the gas tank 140.

Cooling water flows out of the water passage 115 through the water pipe 180. A tip end of the pipe 180 is inserted and connected to the pipe hole 132b of the expansion 132a of the water tank 130. The water pipe 180 communicates with the space defined by the expansion 132a, 135a of the water tank 130.

A part of gas exhausted from the engine passes through the flange 148, the exhaust passage 140C and the gas passage 114, and flows out of the outlet gas tank 160 through the flange 163. The gas flowing out of the gas tank 160 is again drawn into the engine.

In contrast, cooling water passes through the inlet water pipe 170, the outside space 140D of the gas tank 140, the projection 145, the communication portion 150, the expansion 133c, the expansion 133a, 136a, and the outside space 130E of the water tank 130 (the inlet opening 113a, the water passage 115, the outlet opening 113b), and flows out of the water tank 130 through the expansion 132a, 135a and the outlet water pipe 180.

Heat is exchanged between gas passing through the gas passage 114 and cooling water passing through the water passage 115, so that the gas is cooled.

According to the present embodiment, the inlet gas tank 140 has the dual structure. Specifically, the outside space 140D is defined outside of the exhaust passage 140C. Further, due to the communication portion 150, the outside space 140D of the gas tank 140 communicates with the outside space 130E of the water tank 130.

Therefore, cooling water can flow through the outside space 140D of the gas tank 140 other than the outside space 130E of the water tank 130, due to the communication portion 150. Thus, the inlet gas tank 140 and the flange 148 can be effectively cooled by the cooling water, while the tank 140 and the flange 148 receive heat from gas exhausted from the engine. In a comparison case, when temperatures of the tank 140 and the flange 148 are raised, mechanical connection strength between the flange 148 and the exhaust pipe is lowered. Further, strength of the tank 140 is lowered, and excessive thermal stress is generated between the water tank 130 and the inlet gas tank 140. In contrast, according to the present embodiment, these disadvantages can be reduced. Therefore, the gas cooler 100A can be made with a material having a low heat resisting property such as aluminum.

Because the communication portion 150 is defined by connecting the expansion 133c of the water tank 130 and the expansion 145 of the inlet gas tank 140, original pipe is unnecessary. Thus, the communication portion 150 can be integrally formed with the water tank 130 and the inlet gas tank 140.

The inlet water pipe 170 is connected to the gas tank 140, and cooling water flows in order of the outside space 140D of the gas tank 140, the communication portion 150, and the outside space 130E of the water tank 130. Therefore, all of the cooling water used in the gas cooler 100A can be supplied to the outside space 140D of the gas tank 140, so that the inlet gas tank 140 and the flange 148 can be effectively cooled.

The inlet water pipe 170 is arranged on a side of the gas tank 140 opposite from the communication portion 150. Therefore, cooling water flowing into the outside space 140D of the gas tank 140 through the water pipe 170 can be divided into two flows, and each flow moves in a circumference direction of the outside space 140D. Further, the two flows join with each other at the communication portion 150 located opposite from the water pipe 170. Therefore, cooling water can entirely flow over the outside space 140D of the gas tank 140, so that the tank 140 and the flange 148 can be effectively cooled.

The inlet gas tank 140 is produced by connecting the tanks 140A, 140B. Therefore, complicated processing is unnecessary, and the gas tank 140 having the outside space 140D can be easily produced.

The divider 112A separates the outside space 130E of the water tank 130 from inside of the gas tank 140, 160, and is formed by connecting the projections 112 of the tubes 110 in the tube layering direction. Therefore, original divider made of a plate member, for example, is unnecessary.

Second Embodiment

An EGR gas cooler 100B of a second embodiment will be described with reference to FIGS. 5 and 6. The outside tank 140A of the gas tank 140 and the water tank 130 of the first embodiment are integrally formed in the second embodiment. Further, flowing directions of cooling water and exhaust gas are changed, and the gas cooler 100B further includes a communication portion 151 other than the communication portion 150.

Figure 5:
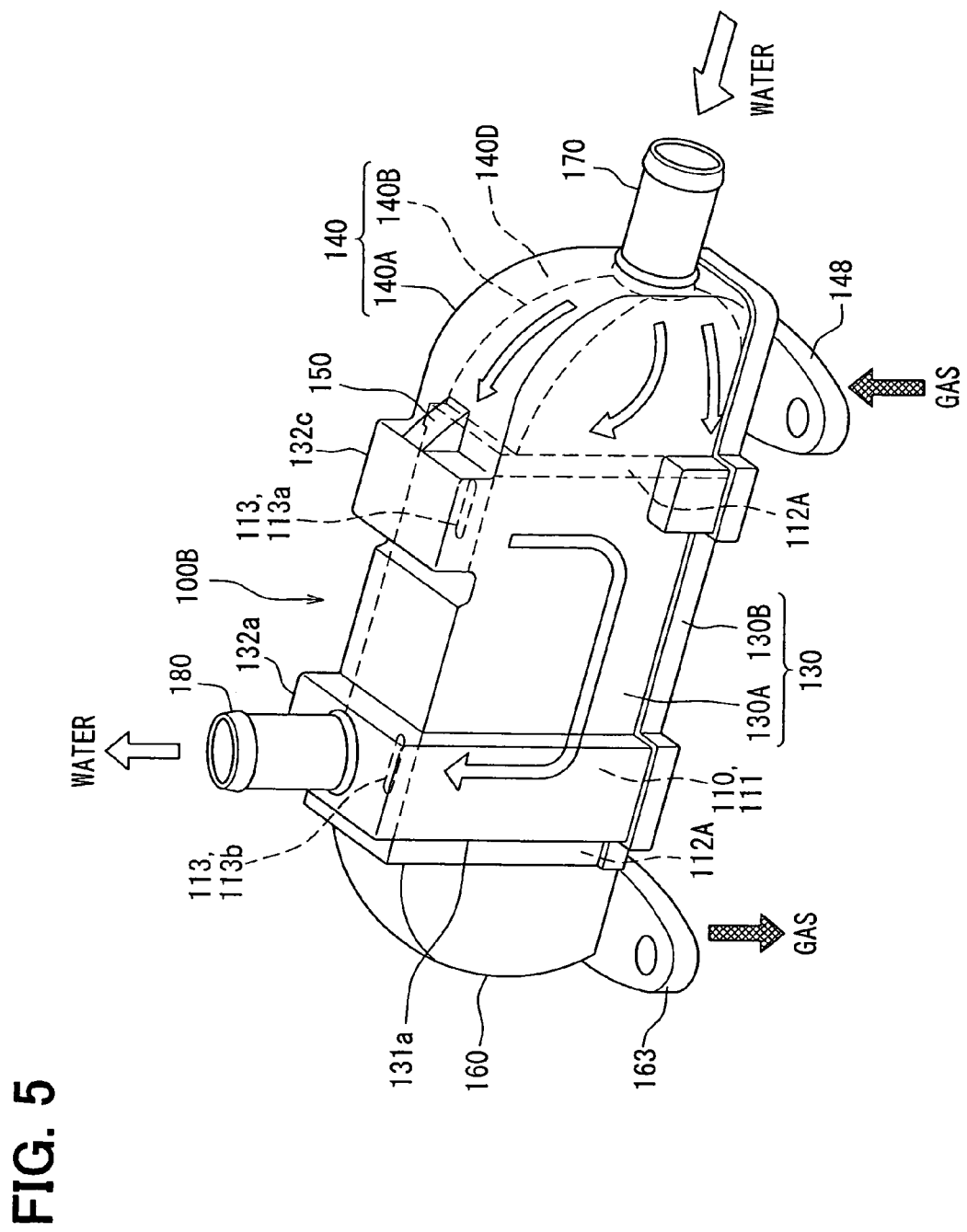
FIG. 5 is a perspective view illustrating an EGR gas cooler according to a second embodiment.
Figure 6:
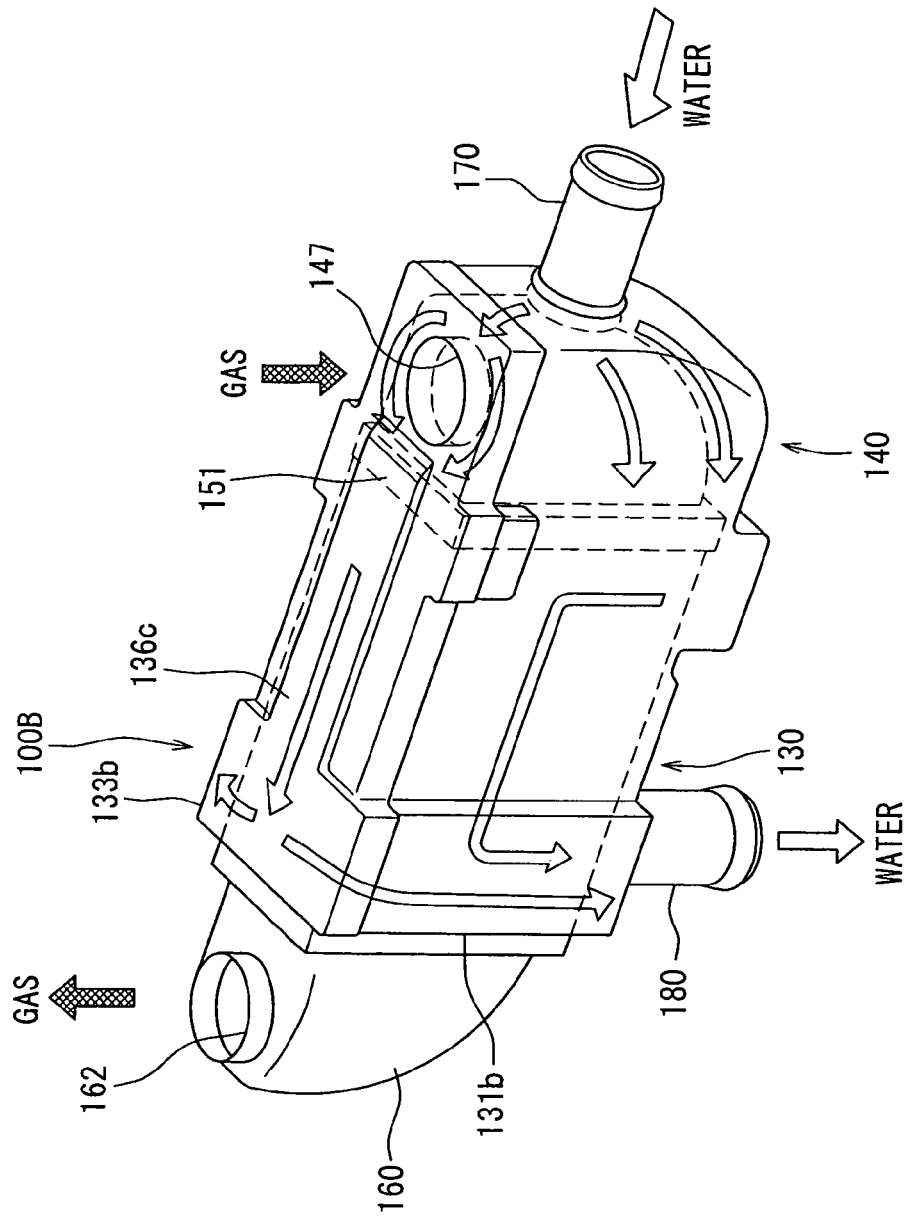
FIG. 6 is a perspective view illustrating a lower side of the EGR gas cooler of the second embodiment.

As shown in FIG. 5, the recess 113 of the tube 110 is defined at two positions on the same longer side of the base face 111. The inlet opening 113a and the outlet opening 113b are located on the same side face of the layered tubes 110. Therefore, the water passage 115 has a U-shape.

The water tank 130 has a first part 130A arranged on an upper side of the tube 110, and a second part 130B arranged on a lower side of the tube 110. The first part 130A has an expansion 132c at a position corresponding to the inlet opening 113a, and an expansion 132a at a position corresponding to the outlet opening 113b. As shown in FIG. 6, the second part 130B has an expansion 136c and an expansion 133b communicating with the expansion 136c. The expansion 136c opposes to a side face of the tube 110, and extends in the tube longitudinal direction. Further, each side face of the water tank 130 has an expansion 131a, 131b connecting the expansion 132a to the expansion 133b.

The outside tank 140A of the inlet gas tank 140 is integrated with the water tank 130. The inside tank 140B of the gas tank 140 has a first opening part and a second opening part. The first opening part is joined to an outer periphery of the divider 112A of the tubes 110. The second opening part has a flange hole 147 to which the flange 148 is fixed, and the flange hole 147 opens in a direction intersecting an axis of the first opening part. That is, as shown in FIG. 5, the first opening part opens in the tube longitudinal direction, and the flange hole 147 opens downward, so that an inner passage of the inside tank 140B has an L-shape.

The inlet water pipe 170 communicates with the outside space 140D of the gas tank 140, and opens in the direction corresponding to the axis of the first opening part. That is, the inlet water pipe 170 is open in the direction corresponding to the tube longitudinal direction.

The gas cooler 100B has at least two communication portions 150, 151, so that the inside of the water tank 130 can communicate with the outside space 140D of the gas tank 140. The communication portion 150 is located between the outside space 140D and the expansion 132c. The communication portion 151 is located between the outside space 140D and the expansion 136c. The communication portions 150, 151 are arranged on an outer periphery of the first opening part, and oppose to each other relative to an axis of the gas tank 140.

The outlet gas tank 160 has a first opening part and a second opening part. The first opening part is joined to an outer periphery of the divider 112A of the tubes 110. The second opening part has a flange hole 162 to which the flange 163 is fixed, and opens in a direction intersecting an axis of the first opening part. That is, as shown in FIG. 5, the first opening part opens in the tube longitudinal direction, and the flange hole 162 opens downward, so that an inner passage of the tank 160 has an L-shape.

A part of exhaust gas passes in order of the flange 148, the inside tank 140B of the gas tank 140, the gas passage 114 of the tube 110, the outlet gas tank 160 and the flange 163. The gas flows into the gas cooler 100B from the lower side, and flows out of the gas cooler 100B downward. The gas flowing out of the gas cooler 100B is again drawn into the engine.

Cooling water flows into of the water pipe 170 in a horizontal direction, and is separated into two flows in the outside space 140D of the gas tank 140. As shown in FIG. 5, one of the flows passes in order of an upper side of the outside space 140D, the communication portion 150, the expansion 132c, the U-shaped water passage 115, the expansion 132a and the water pipe 180. As shown in FIG. 6, the other flow passes in order of a lower side of the outside space 140D, the communication portion 151, the expansion 136c, the expansion 133b, the expansion 131a, 131b and the water pipe 180.

According to the second embodiment, cooling water flowing into the outside space 140D of the gas tank 140 through the pipe 170 can be divided into the communication portions 150, 151 located opposite from each other. Therefore, even in a case where the pipe 170 is open in the axis direction of the first opening part of the gas tank 140, cooling water can flow entire of the outside space 140D of the gas tank 140. Thus, the inlet gas tank 140 and the flange 148 can be effectively cooled.

Third Embodiment

A gas cooler 100C of a third embodiment will be described with reference to FIGS. 7 and 8. Compared with the first embodiment, the inlet water pipe 170 is connected to the water tank 130, and the gas cooler 100C further includes a communication portion 151 other than the communication portion 150, in the third embodiment.

Figure 7:
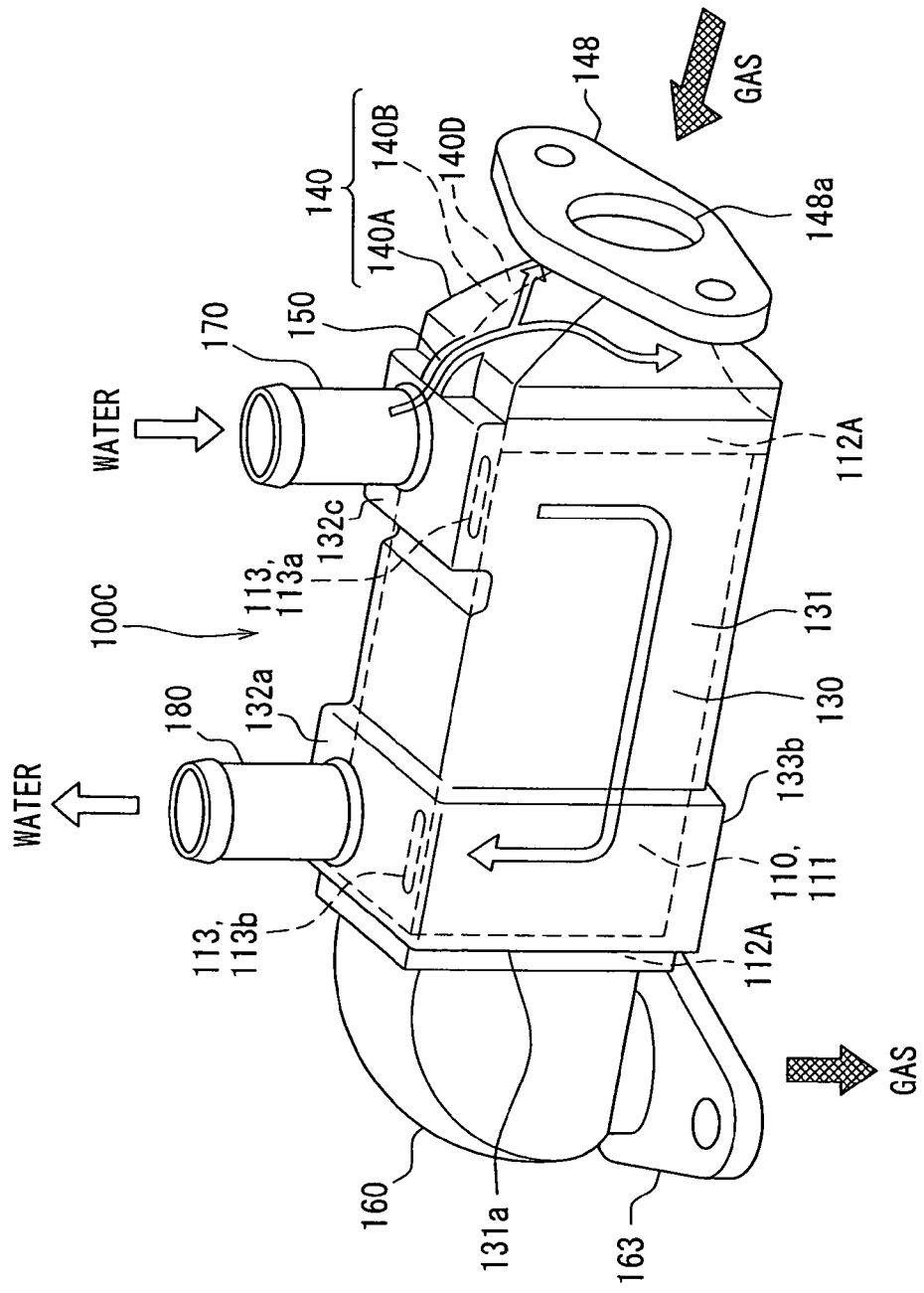
FIG. 7 is a perspective view illustrating an EGR gas cooler according to a third embodiment.
Figure 8:
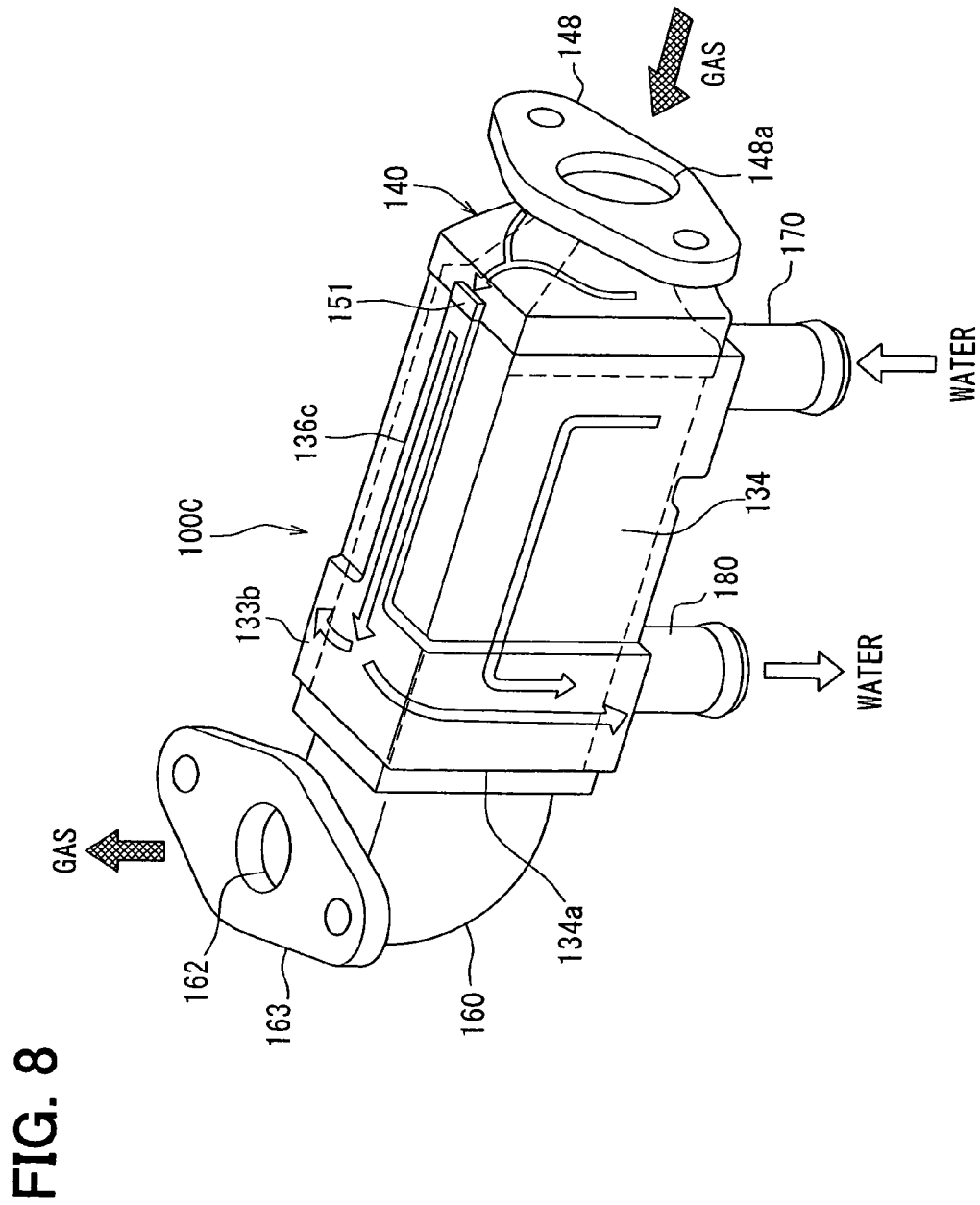
FIG. 8 is a perspective view illustrating a lower side of the EGR gas cooler of the third embodiment.

As shown in FIG. 7, the recess 113 of the tube 110 is defined at two positions on the same longer side of the base face 111. The inlet opening 113a and the outlet opening 113b are located on the same side face of the layered tubes 110. Therefore, the water passage 115 has a U-shape.

The water tank 130 has an expansion 132c at a position corresponding to the inlet opening 113a, and an expansion 132a at a position corresponding to the outlet opening 113b. As shown in FIG. 8, the water tank 130 has an expansion 136c and an expansion 133b communicating with the expansion 136c. The expansion 136c opposes to a side face of the tube 110 opposite from the opening 113a, 113b, and extends in the tube longitudinal direction. Further, the main part 131, 134 of the water tank 130 has an expansion 131a, 134a, respectively, that connects the expansion 132a to the expansion 133b.

The inlet water pipe 170 communicates with inside of the expansion 132c, and is connected to the water tank 130.

The gas cooler 100C has at least two communication portions 150, 151, so that the inside of the water tank 130 can communicate with the outside space 140D of the gas tank 140. The communication portion 150 is located between the outside space 140D and the expansion 132c. The communication portion 151 is located between the outside space 140D and the expansion 136c. The communication portion 150 is located adjacent to the water pipe 170. The communication portion 151 is arranged on an outer periphery of the first opening part of the inside tank 140B of the gas tank 140, and opposes to the communication portion 150 relative to an axis of the water tank 130.

The outlet gas tank 160 has a first opening part and a second opening part. The first opening part is joined to an outer periphery of the divider 112A of the tubes 110. The second opening part is a flange hole 162 to which the flange 163 is fixed, and opens in a direction intersecting an axis of the first opening part. That is, as shown in FIG. 7, the first opening part opens in the tube longitudinal direction, and the flange hole 162 opens downward, so that an inner passage of the tank 160 has an L-shape.

A part of exhaust gas passes in order of the flange 148, the inside tank 140B of the gas tank 140, the gas passage 114 of the tube 110, the outlet gas tank 160 and the flange 163. The gas flows into the gas cooler 100C in the horizontal direction, and flows out of the gas cooler 100C downward. The gas flowing out of the cooler 100C is again drawn into the engine.

Cooling water flows into of the water pipe 170 from the upper side, and is separated into two flows in the expansion 132c. One of the flows passes in order of the expansion 132c, the U-shaped water passage 115, the expansion 132a and the water pipe 180. The other flow passes in order of the expansion 132c, the communication portion 150 and the outside space 140D of the gas tank 140. At the outside space 140D, the other flow is further separated into two flows in a circumference direction, and the separated flows join with each other at the communication portion 151. Then, the other flow flows in order of the expansion 136c, the expansion 133b, the expansion 131a, 134a and the water pipe 180.

According to the third embodiment, when cooling water is supplied to the water tank 130, a part of the cooling water flows into the outside space 140D of the gas tank 140 through the communication portion 150. This technique is suitable for a case where it is unnecessary to supply all of the cooling water to the outside space 140D, based on a degree of heat emitted from exhaust gas relative to the inlet gas tank 140 and the flange 148.

According to the third embodiment, a part of cooling water flowing into the water tank 130 through the water pipe 170 flows into the outside space 140D through the communication portion 150 located adjacent to the water pipe 170. Then, the flow of cooling water is separated into two flows. One flows in a clockwise direction in the outside space 140D, and the other flows in a counterclockwise direction in the outside space 140D. Further, the one and the other join with each other at the communication portion 151, and the joined water flows into the water tank 130 again. Therefore, cooling water can flow entire of the outside space 140D. Thus, the inlet gas tank 140 and the flange 148 can be effectively cooled.

Fourth Embodiment

Figure 9:
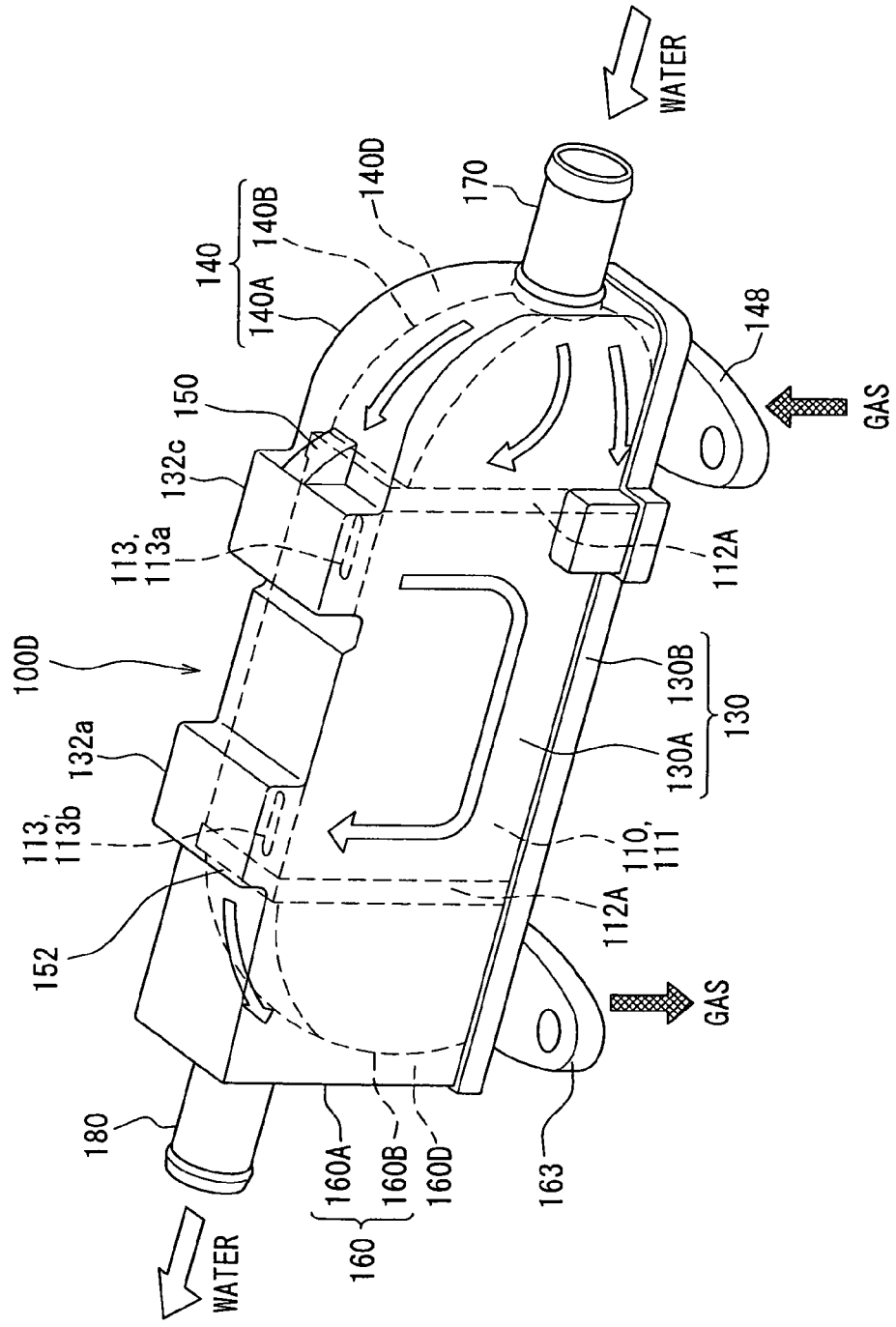
FIG. 9 is a perspective view illustrating an EGR gas cooler according to a fourth embodiment.
Figure 10:
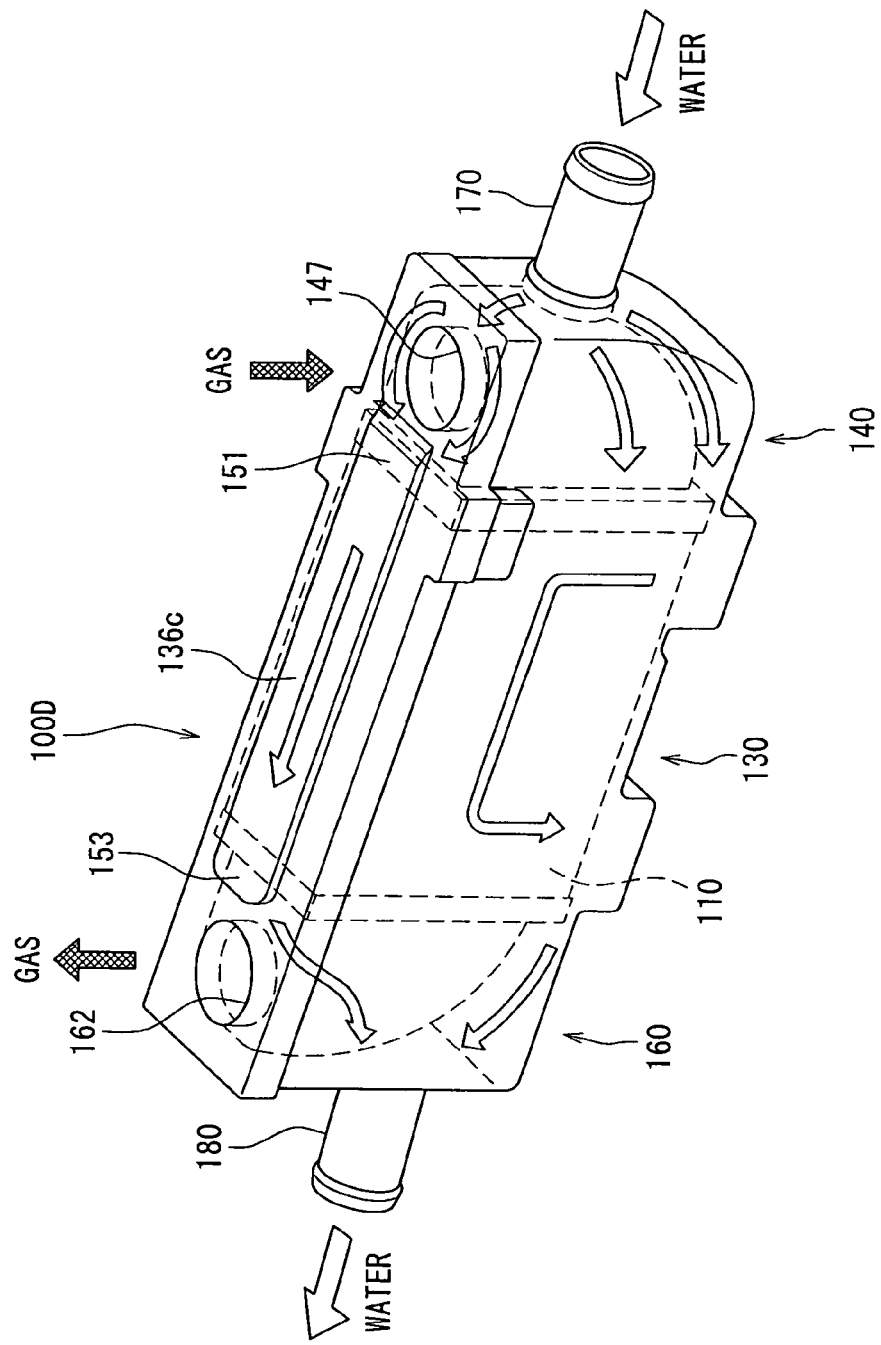
FIG. 10 is a perspective view illustrating a lower side of the EGR gas cooler of the fourth embodiment.

A gas cooler 100D of a fourth embodiment will be described with reference to FIGS. 9 and 10. The outside tank 160A of the gas tank 160 and the water tank 130 of the second embodiment are integrally formed in the fourth embodiment. Further, a direction of cooling water flowing out of the gas cooler 100D is changed compared with the second embodiment.

The water tank 130 has a first part 130A arranged on an upper side of the tube 110, and a second part 130B arranged on a lower side of the tube 110. The outside tank 140A of the gas tank 140 and the outside tank 160A of the gas tank 160 are integrated with the water tank 130. The expansions 131a, 131b of the second embodiment are eliminated in the fourth embodiment.

The outlet gas tank 160 has the same construction as the inlet gas tank 140. That is, the outlet gas tank 160 is constructed by the outside tank 160A and the inside tank 160B. The outside tank 160A is integrated with the water tank 130. The inside tank 160B has a first opening part and a second opening part. The first opening part is joined to an outer periphery of the divider 112A of the tubes 110. The second opening part has a flange hole 162 to which the flange 163 is fixed, and the flange hole 162 opens in a direction intersecting an axis of the first opening part. That is, as shown in FIG. 9, the first opening part opens in the tube longitudinal direction, and the flange hole 162 opens downward, so that an inner passage of the inside tank 160B has an L-shape.

The water pipe 180 communicates with the outside space 160D of the gas tank 160, and opens in a direction parallel with the axis of the first opening part. That is, the water pipe 180 is open in the direction corresponding to the tube longitudinal direction.

The gas cooler 100D further has at least two communication portions 152, 153 that make the inside of the water tank 130 to communicate with the outside space 160D of the outlet gas tank 160. The communication portion 152 is located between the outside space 160D and the expansion 132a. The communication portion 153 is located between the outside space 160D and the expansion 136c.

A part of exhaust gas passes in order of the flange 148, the inside tank 140B of the inlet gas tank 140, the gas passage 114 of the tube 110, the inside tank 160B of the outlet gas tank 160 and the flange 163. Exhaust gas flows into the gas cooler 100D from the lower side, and flows out of the gas cooler 100D downward. Exhaust gas flowing out of the gas cooler 100D is again drawn into the engine.

Cooling water flows into of the pipe 170 in a horizontal direction, and is separated into two flows in the outside space 140D of the gas tank 140. One of the flows passes in order of an upper side of the outside space 140D, the communication portion 150, the expansion 132c, the U-shaped water passage 115, the expansion 132a, the communication portion 152, an upper side of the outside space 160D and the water pipe 180. The other flow passes in order of a lower side of the outside space 140D, the communication portion 151, the expansion 136c, the communication portion 153, a lower side of the outside space 160D and the water pipe 180.

According to the fourth embodiment, similar to the second embodiment, cooling water flowing into the outside space 140D through the pipe 170 can be divided toward the communication portions 150, 151 located opposite from each other. Therefore, even in a case where the pipe 170 is open in the axis direction of the first opening part of the gas tank 140, cooling water can flow entire of the outside space 140D. Thus, the inlet gas tank 140 and the flange 148 can be effectively cooled.

Fifth Embodiment

A gas cooler 100E of a fifth embodiment will be described with reference to FIGS. 11-13. Compared with the first embodiment, a direction of cooing water flowing into the gas cooler 100E is changed, and a separator 149 is arranged in the outside space 140D of the gas tank 140.

Figure 11:
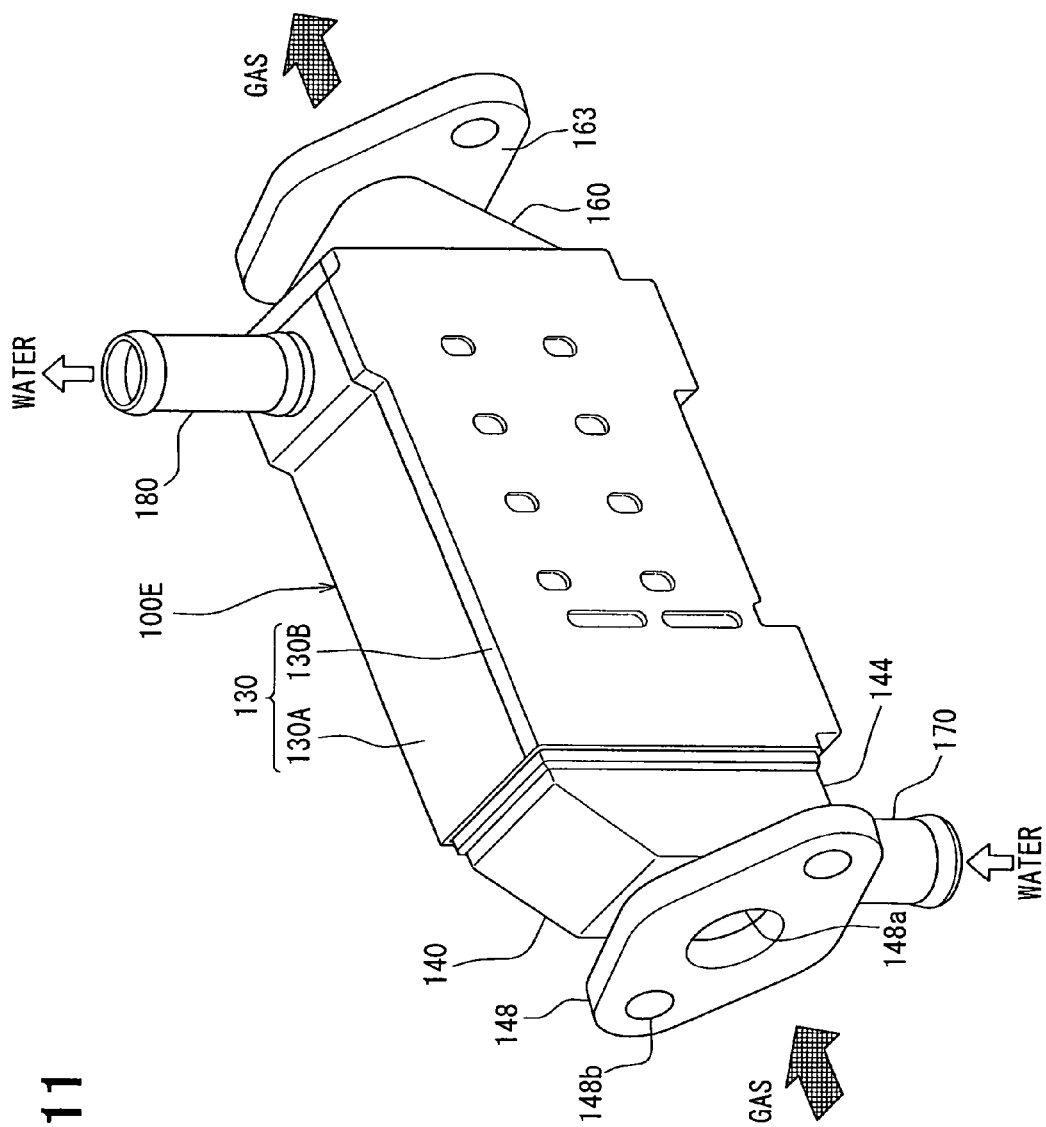
FIG. 11 is a perspective view illustrating an EGR gas cooler according to a fifth embodiment.
Figure 12:
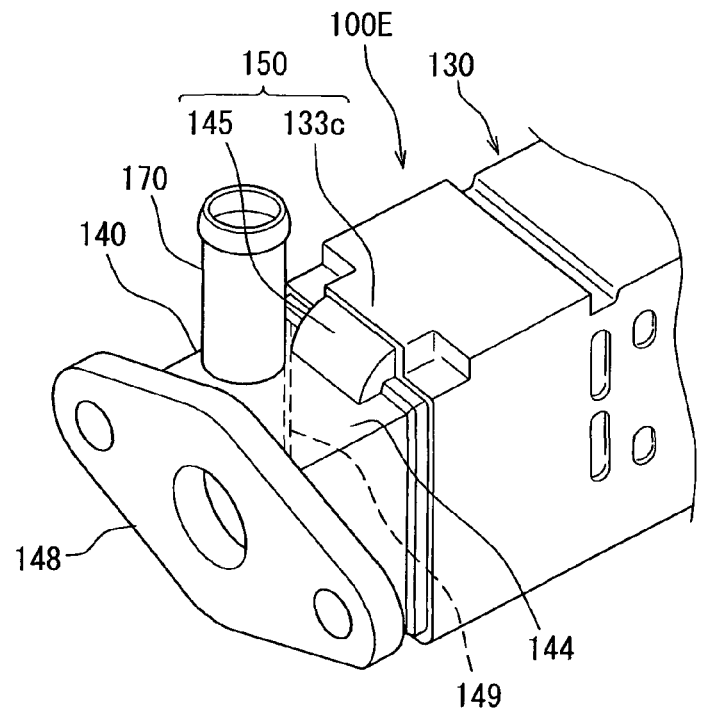
FIG. 12 is a perspective view illustrating a lower side of the EGR gas cooler of the fifth embodiment.

As shown in FIG. 11, the outside tank 140A of the gas tank 140 has a funnel shape, similar to the inside tank 140B of the gas tank 140. As shown in FIG. 13, a clearance is defined between the tanks 140A, 140B, and the clearance has a predetermined width over the tube longitudinal direction. The outside space 140D is defined by the clearance.

As shown in FIG. 11, the water pipe 170 is inserted and connected to a pipe hole (not shown) of the outer wall 144 of the outside tank 140A located on the lower side. Therefore, as shown in FIG. 12, the water pipe 170 and the communication portion 150 are located adjacent to each other. As shown in FIG. 13, the water pipe 170 communicates with the outside space 140D.

The separator 149 is arranged in the outside space 140D at a position between an area communicating with the pipe 170 and an area adjacent to the communication portion 150, so that the areas are separated from each other by the separator 149 having a board shape. An end of the separator 149 is connected to an inner wall of the outside tank 140A, and the other end of the separator 149 is connected to an outer wall of the inside tank 140B.

As shown in FIG. 11, a part of gas exhausted from the engine passes in order of the flange 148, the inside tank 1406 of the gas tank 140, the gas passage 114 of the tube 110, the outlet gas tank 160 and the flange 163. Exhaust gas flows into the gas cooler 100E in the horizontal direction, and flows out of the gas cooler 100E in the horizontal direction. Exhaust gas flowing out of the gas cooler 100E is again drawn into the engine.

Figure 13:
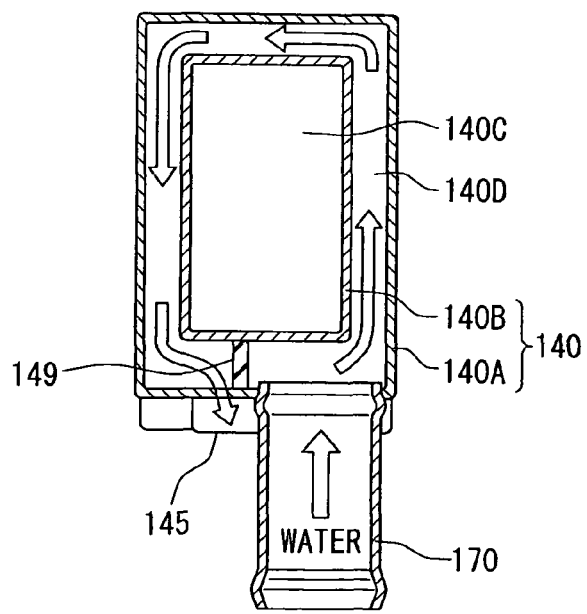
FIG. 13 is a cross-sectional view illustrating an inlet gas tank of the EGR gas cooler of the fifth embodiment.

In contrast, as shown in FIG. 13, cooling water flows into the outside space 140D through the pipe 170 from the lower side. Cooling water is restricted from directly flowing into the communication portion 150 from the pipe 170, due to the separator 149, so that cooling water flows one orbit in a circumference direction relative to an axis of the gas tank 140 before reaching the communication portion 150. The axis of the gas tank 140 corresponds to a gas flowing direction. Further, cooling water flows in order of the communication portion 150, the outside space 130E (the inlet opening 113a, the water passage 115, the outlet opening 113b) and the water pipe 180.

According to the fifth embodiment, the flow of cooling water has one orbit in the circumference direction of the outside space 140D. Therefore, cooling water can flow entire of the outside space 140D. Thus, the gas inlet tank 140 and the flange 148 can be effectively cooled.

Sixth Embodiment

Figure 14:
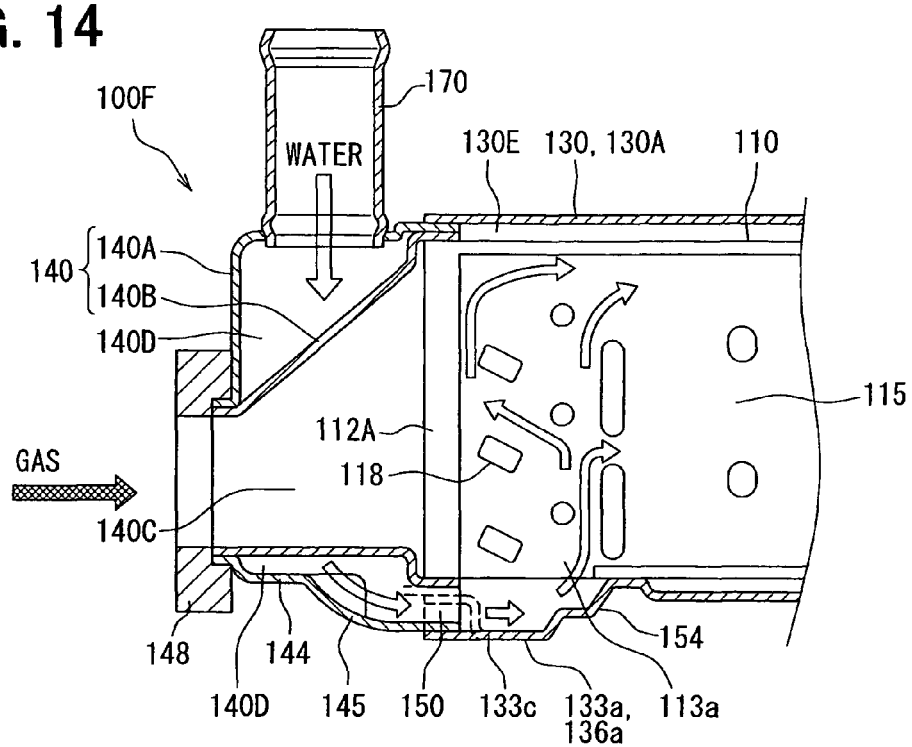
FIG. 14 is a cross-sectional view illustrating an EGR gas cooler according to a sixth embodiment.

A gas cooler 100F of a sixth embodiment will be described with reference to FIG. 14. In the first embodiment, after cooling water flows through the communication portion 150 in the horizontal direction, most of cooling water may flow along the tube longitudinal direction in the outside space 130E of the water tank 130. In this case, a dead water zone is generated in a section of the outside space 130E opposite from the communication portion 150, and the section is located adjacent to the inlet gas tank 140. A flow of cooling water is stagnant in the dead water zone, so that local boiling is easily generated in the dead water zone by heat of exhaust gas. In contrast, in the sixth embodiment, a deflection portion 154 and a deflection rib 118 are added so as to prevent the generation of the dead water zone in the outside space 130E.

The deflection portion 154 is defined in the communication portion 150 constructed by the expansions 133c, 145 as a step part having a stairway shape. The deflection portion 154 is located on a downstream end of the communication portion 150 in the water flowing direction, while the communication portion 150 extends from the outside space 140D of the gas tank 140 to the outside space 130E of the water tank 130. As shown in FIG. 14, the horizontal flow of cooling water passing through the communication portion 150 is made to flow in a direction approximately perpendicularly to the tube longitudinal direction, due to the deflection portion 154, from the lower side to the upper side.

The deflection rib 118 is located adjacent to the gas tank 140 in the tube longitudinal direction, and protrudes outward from a surface of the tube 110. A plurality of the deflection ribs 118 is arranged in a width direction of the tube 110 perpendicular to the tube longitudinal direction. The rib 118 has a narrow rectangular shape, and a longitudinal direction of the rib 118 has an angle relative to the tube longitudinal direction. The rib 118 extends in a direction extending from the deflection portion 154 toward a corner of the tube 110 located opposite from the deflection portion 154.

According to the sixth embodiment, cooling water horizontally flowing through the outside space 140D of the gas tank 140 and the communication portion 150 collides to the deflection portion 154, and flows in the perpendicular direction in the outside space 130E. Further, a part of cooling water flowing into the outside space 130E is made to flow toward the gas tank 140 by the rib 118, so that the part of cooling water flows from the deflection portion 154 toward the corner of the tube 110. Then, cooling water flows in the tube longitudinal direction, and flows out of the gas cooler 100F through the water pipe 180.

Therefore, cooling water flowing into the outside space 130E of the water tank 130 from the communication portion 150 can flow entire surface of the tube 110, so that the generation of the dead water zone can be restricted. Thus, the local boiling of cooling water can be reduced.

Seventh Embodiment

Figure 15:
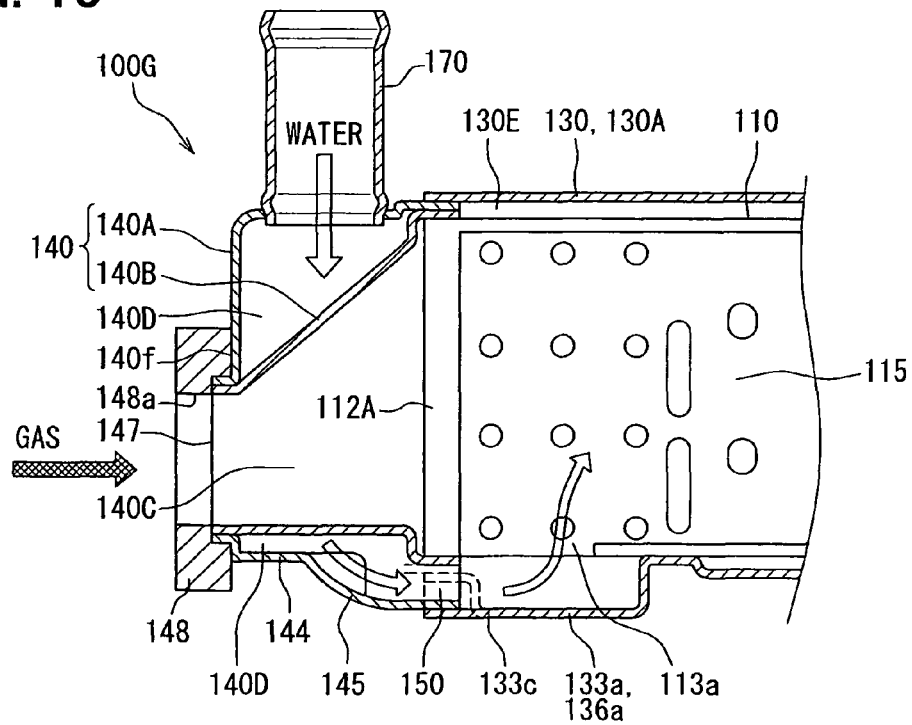
FIG. 15 is a cross-sectional view illustrating an EGR gas cooler according to a seventh embodiment.

A gas cooler 100G of a seventh embodiment will be described with reference to FIG. 15. If the outside tank 140A of the gas tank 140 has a funnel shape similar to the inside tank 140B, for example, an area of the brazing between the flange 148 and an outer periphery of the flange hole 147 is small. In this case, sufficient connection strength cannot be obtained between the flange 148 and the gas tank 140. Therefore, in the seventh embodiment, the flange 148 and the outside tank 140A of the gas tank 140 are brazed with each other with a stronger connection.

The outside tank 140A has a rectangular parallelepiped shape, and has a flat part 140$f$ around the flange hole 147. The flat part 140$f$ is perpendicular to an axis of the flange hole 147. Both faces of the outside tank 140A are clad with brazing material.

The flange 148 is a lozenge-shaped thick board member, and a face of the flange 148 opposing to the flat part 140$f$ also has a lozenge shape. An inner periphery of the flange 148 defining the communication hole 148$a$ is brazed to an outer periphery of a burring of the flange hole 147 of the gas tank 140. Further, the lozenge-shaped face of the flange 148 has a brazing area brazed to the flat part 140$f$.

According to the seventh embodiment, the brazing area between the flange 148 and the outside tank 140A of the gas tank 140 can be increased, so that the connection strength between the flange 148 and the outside tank 140A can be improved. Further, because the brazing area between the flange 148 and the outside tank 140A can be increased, the flange 148 can be effectively cooled by cooling water flowing through the outside space 140D. Thus, heat-withstanding property of the flange 148 can be improved by restricting the temperature increasing of the flange 148.

Eighth Embodiment

A gas cooler 100H of an eighth embodiment will be described with reference to FIGS. 16 and 17. The flange 148 is produced by performing a cutting and shaving process or a punching process relative to a thick board made of aluminum, for example. The tubes 110 and the tanks 130, 140 are produced by a pressing process so that a surface of the tube 110 or the tank 130, 140 can be clad with sacrifice corrosion layer, but a surface of the flange 148 cannot be clad with sacrifice corrosion layer in advance. An inner circumference face of the communication hole 148$a$ of the flange 148 easily has corrosion because the inner face is exposed with exhaust gas. In the eighth embodiment, a sacrifice corrosion layer is formed on the inner circumference face of the communication hole 148$a$ of the flange 148 using a collar 201, 202.

The collar 201 is a ring-shaped member. A flange of the outside tank 140A and a flange of the inside tank 140B are fitted with the communication hole 148$a$. An outer circumference face of the collar 201 is brazed to the inner circumference face of the communication hole 148$a$ in a section except the flanges of the tanks 140A, 140B. A sacrifice corrosion layer is arranged on an inner circumference face of the collar 201 in advance.

The sacrifice corrosion layer is corroded by exhaust gas, before the flange 148 is corroded. Therefore, the inner circumference face of the hole 148$a$ of the flange 148 is restricted from having direct corrosion.

Figure 16:
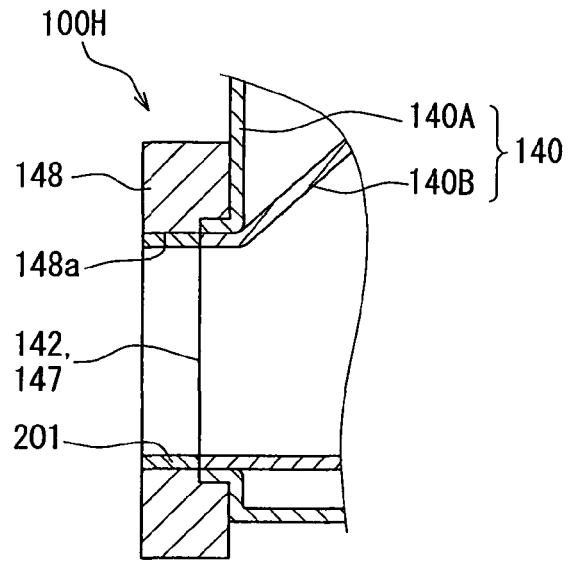
FIG. 16 is a cross-sectional view illustrating an EGR gas cooler according to an eighth embodiment.
Figure 17:
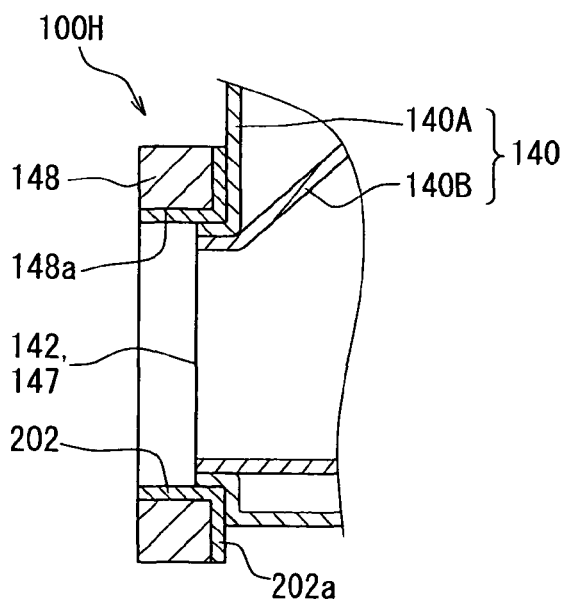
FIG. 17 is a cross-sectional view illustrating an EGR gas cooler according to an eighth embodiment.

As shown in FIG. 17, a collar 202 having a flange part 202$a$ may be used in place of the collar 201 of FIG. 16.

Ninth Embodiment

Figure 18:
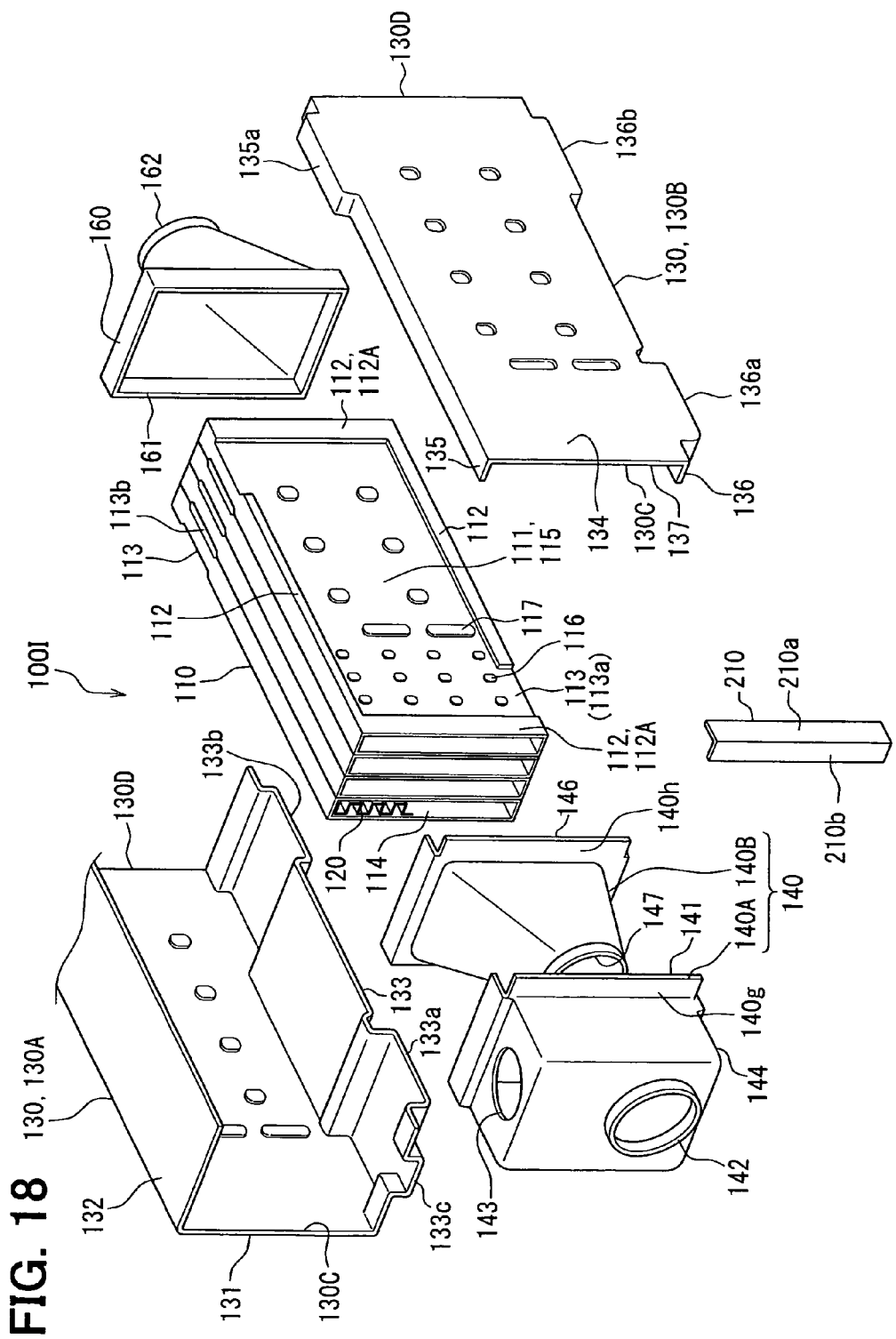
FIG. 18 is an exploded perspective view illustrating an EGR gas cooler according to a ninth embodiment.

A gas cooler 100I of a ninth embodiment will be described with reference to FIGS. 18 and 19. In the first embodiment, the tubes 110 are directly layered with each other through the projections 112. A layering dimension of the layered tubes 110 becomes smaller after the tubes 110 are brazed with each other, because a brazing material located between the tubes 110 melts and flows in the brazing. In the first embodiment, as shown in FIG. 4, the tanks 140B, 140A, 130 are connected to the layered tubes 110 in the tube layering direction, and a gap is generated between the tube 110 and the inside tank 140B if the layering dimension of the layered tubes 110 is reduced. In this case, quality of the brazing will be lowered. In contrast, according to the ninth embodiment, the gas tank 140 has a bent part 140$g$, 140$h$, and a board member 210 is arranged between the water tank 130 and the gas tank 140, so as to absorb the decreasing dimension of the layered tubes 110 in the tube layering direction.

The main part 131, 134 of the water tank 130A, 130B opposes to the tube base face 111. Before the brazing, the water tanks 130A, 130B are arranged in the tube layering direction. In the brazing, the upper part 135 of the second water tank 130B overlaps with the upper part 132 of the first water tank 130A from outside, and the lower part 136 of the second water tank 130B overlaps with the lower part 133 of the first water tank 130A from outside. A dimension of the water tank 130 is controlled in the tube layering direction by controlling an overlap dimension of the water tanks 130A, 130B in the tube layering direction before the brazing.

The outside tank 140A of the gas tank 140 has the bent part 140$g$ on a single side of the rectangular opening 141. The rectangular opening 141 has four sides, and one of the sides that corresponding to the main part 134 of the tank 130B has the bent part 140$g$. A side wall of the outside tank 140A having the bent part 140$g$ extends in a direction intersecting the tube layering direction in the first embodiment, as shown in FIG. 4. In the ninth embodiment, as shown in FIG. 18, the bent part 140$g$ is formed by bending the side wall toward the second water tank 130B, so that the bent part 140$g$ extends in the tube layering direction.

The outside tank 140B of the gas tank 140 has the bent part 140$h$ on a single side of the rectangular opening 146. The rectangular opening 146 has four sides, and one of the sides that corresponding to the main part 134 of the tank 130B has the bent part 140$h$. A side wall of the inside tank 140B having the bent part 140*h* extends in a direction intersecting the tube layering direction in the first embodiment, as show in FIG. 4. In the ninth embodiment, as shown in FIG. 18, the bent part 140*h* is formed by bending the side wall toward the second water tank 130B, so that the bent part 140*h* extends in the tube layering direction.

The board member 210 has an L-shaped cross-section produced by bending a rectangular flat board at a middle in a width direction along a long side. A dimension of the long side is approximately equal to that of a long side of a flat rectangular cross-section of the tube 110. The board member 210 has a first face part 210*a* and a second face part 210*b* constructing the L-shaped cross-section. As shown in FIG. 19, the board member 210 is interposed between the second water tank 130B and the gas tank 140, and has a brazing in this state.

That is, three sides of the opening 146 of the tank 140B except the bent part 140*h* are fitted and brazed to the outer periphery of the layered tubes 110. Further, the first face part 210*a* of the board member 210 is brazed to the projection 112 of the tube 110 opposing to the main part 134 of the second water tank 130B. The second face part 210*b* of the board member 210 is brazed to the bent part 140*h* of the inside tank 140B of the gas tank 140B.

When the inside tank 140B and the board member 210 are assembled with each other, a predetermined clearance is defined between a tip end of the bent part 140*h* and the first face part 210*a* in the tube layering direction. Further, a predetermined clearance is defined between a side wall of the inside tank 140B connected to the bend part 140*h* and a tip end of the second face part 210*b* in the tube layering direction.

The first water tank 130A is brazed to three sides of the opening 146 of the inside tank 140B except the bent part 140*h*. The upper part 135 of the second water tank 130B is brazed to the upper part 132 of the first water tank 130A, and the lower part 136 of the second water tank 130B is brazed to the lower part 133 of the first water tank 130A. The first face part 210*a* of the board member 210 is brazed to an inner face 137 of the main part 134 of the second water tank 130B.

Three sides of the opening 141 of the outside tank 140A except the bent part 140*g* are fitted and brazed to the outer periphery of the first water tank 130A. Further, the bent part 140*g* of the outside tank 140A is brazed to the second face part 210*b*.

Figure 19:
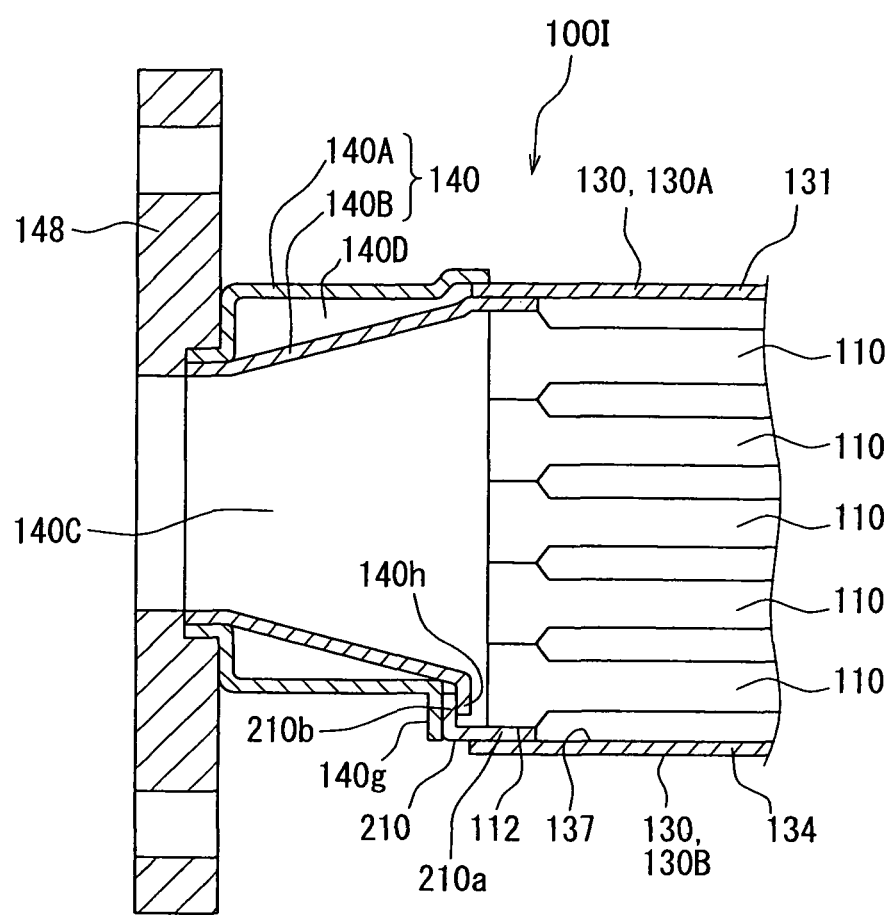
FIG. 19 is a cross-sectional view illustrating the EGR gas cooler of the ninth embodiment.

As shown in FIG. 19, the assembled gas cooler is fixed using a jig, for example, with a predetermined force applied in the tube layering direction. That is, the force is applied from the main part 134 of the tank 130B toward the main part 131 of the first water tank 130A. The temporally-fixed gas cooler is disposed in a brazing chamber, and the brazing is performed.

At this time, the brazing material melts and flows, and the dimension of the layered tubes 110 becomes smaller in the tube layering direction. However, according to the present embodiment, due to the bent parts 140*g*, 140*h* and the board member 210, the first face part 210*a* can move with the second water tank 130B in a direction reducing the dimension of the layered tubes 110 in the tube layering direction. Further, the second face part 210*b* of the board member 210 can move with the bent part 140*g*, 140*h*. Therefore, a gap is not generated between the tube 110 and each component (ex. the water tank 130 or the gas tank 140), so that quality of the brazing can be maintained high.

Tenth Embodiment

A gas cooler 100J of a tenth embodiment will be described with reference to FIG. 20. Similar to the ninth embodiment, the decreasing dimension of the layered tubes 110 is absorbed when the tubes 110 are directly layered with each other.

The water tank 130 has the first water tank 130A and the second water tank 130B connected in the tube layering direction.

The outside tank 140A of the gas tank 140 is constructed by a first tank 1401 and a second tank 1402. The first tank 1401 has a U-shape cross-section similar to the first water tank 130A. That is, the side wall located adjacent to the main part 134 of the second water tank 130B described in the ninth embodiment is eliminated in the outside tank 140A. Further, the second tank 1402 has a board shape to close the eliminated side wall.

Similar to the ninth embodiment, the inside tank 140B of the gas tank 140 has a bent part 140*h*. The outlet gas tank 160 has a bent part 164 similar to the bent part 140*h*.

The second water tank 130B and the second tank 1402 of the gas outside tank 140A are integrated with each other into an integration tank 1314. The integration tank 1314 has a burring 138 produced by bending an outer periphery of the tank 1314 by approximately 90°, so that the tank 1314 has a shallow lid shape. The tank 1314 has a recess 1403 recessed toward the inside tank 140B at a position corresponding to the bent part 140*h* of the inside tank 140B.

Before the brazing, the tank 1314 is attached to cover the tank 130A, 140A, 160 from the open side. At this time, the main part 134 of the second water tank 130B contacts the projection 112 of the tube 110, and the burring 138 contacts a wall face of the tank 130A, 140A, 160. Further, the recess 1403 contacts the bent part 140*h* of the inside gas tank 140B. The position of the tank 1314 can be controlled in the tube layering direction by controlling an overlap dimension between the burring 138 and the recess 1403 in the tube layering direction before the brazing.

Figure 20:
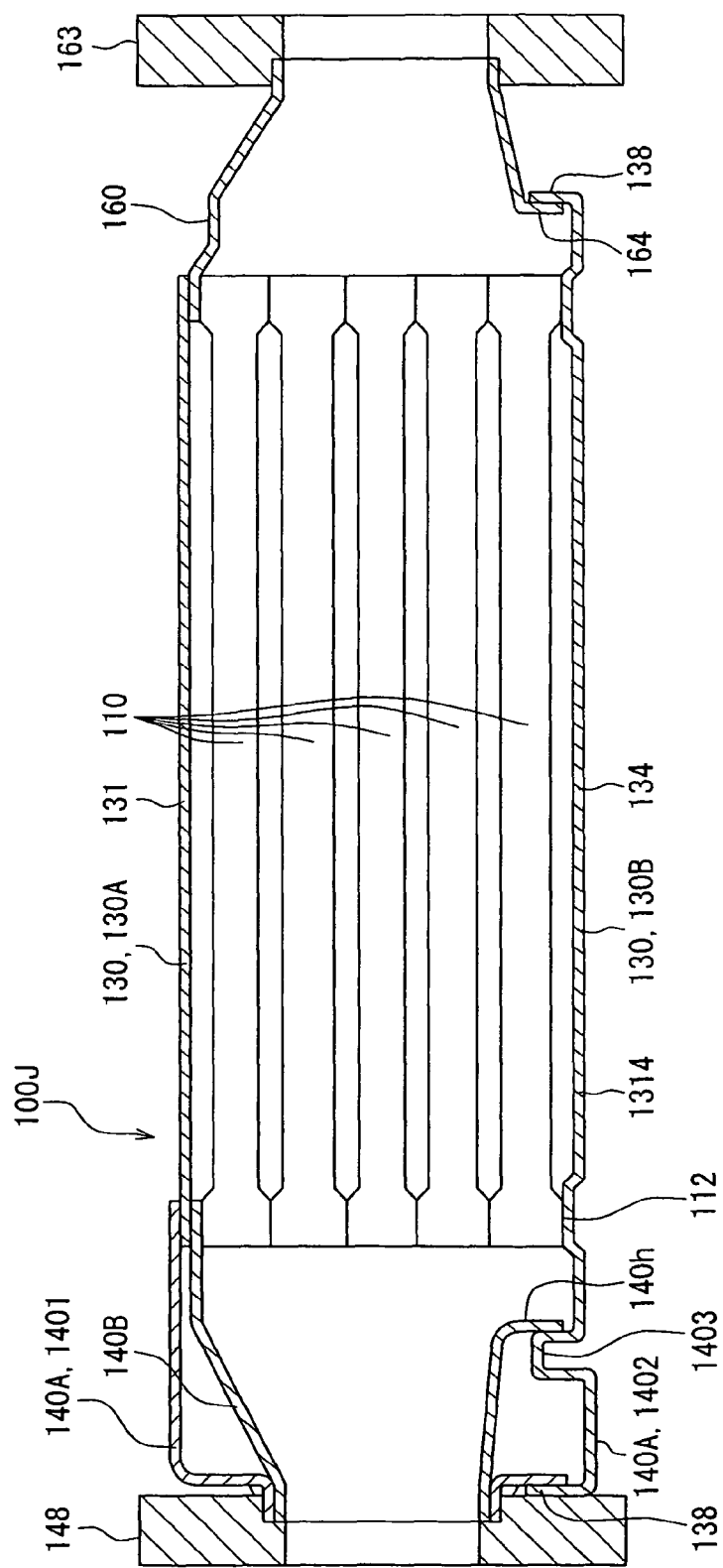
FIG. 20 is a cross-sectional view illustrating an EGR gas cooler according to a tenth embodiment.

As shown in FIG. 20, the assembled gas cooler is fixed using a jig, for example, with a predetermined force applied in the tube layering direction. That is, the force is applied from the integration tank 1314 toward the main part 131 of the first water tank 130A. The temporally-fixed components are disposed in a brazing chamber, and the brazing is performed.

At this time, the brazing material melts and flows, and the dimension of the layered tubes 110 becomes smaller in the tube layering direction. However, according to the present embodiment, the second water tank 130B and the tank 1402 are integrated into the integration tank 1314, so that the integration tank 1314 can move in a direction reducing the dimension of the layered tubes 110. Therefore, a gap is not generated between the tube 110 and each component (ex. the water tank 130 or the gas tank 140), so that quality of the brazing can be maintained high.

Eleventh Embodiment

A gas cooler 100K of an eleventh embodiment will be described with reference to FIGS. 21-23. The tubes 110 are directly layered with each other, and the decreasing dimension of the layered tubes 110 is absorbed, in the ninth and tenth embodiments. In the eleventh embodiment, as shown in FIG. 23, the gas cooler 100K includes a plate 190, and a longitudinal end portion of a tube 110A penetrates the plate 190. An outer periphery of the plate 190 is connected to an inner periphery of the tank 130, 140, 160. In the first to tenth embodiments, the projections 112 of the tubes 110 define the divider 112A. In contrast according to the eleventh embodiment, a divider to separate the outside space 130E of the water tank 130 from the exhaust passage 140C is defined by the plate 190 other than the tube 110A.

The tube 110A is a normal tube not having the projection 112 and the recess 113 compared with the tube 110.

Figure 22:
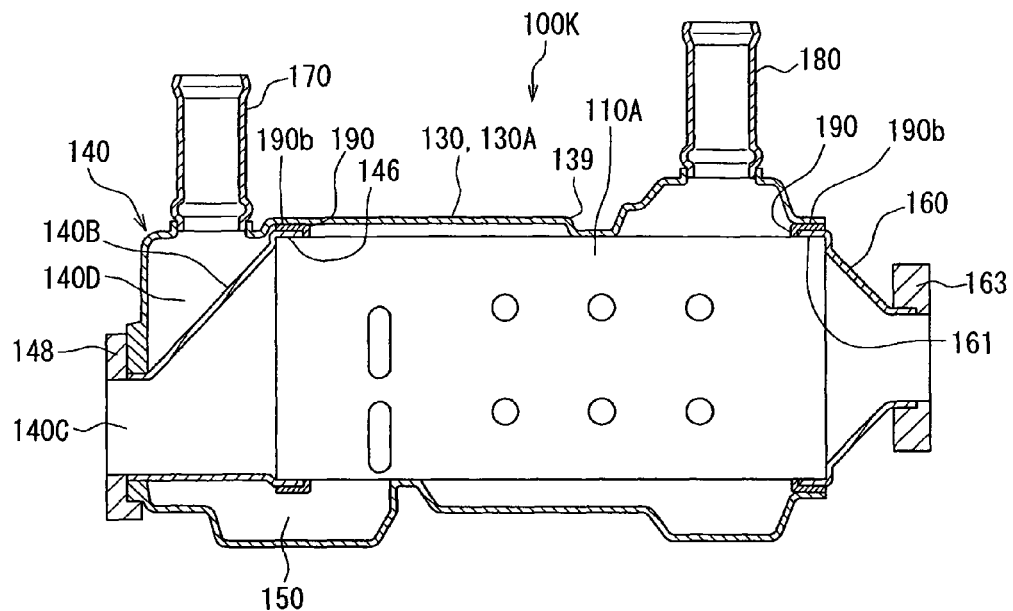
FIG. 22 is a longitudinal cross-section view illustrating the EGR gas cooler of the eleventh embodiment.
Figure 23:
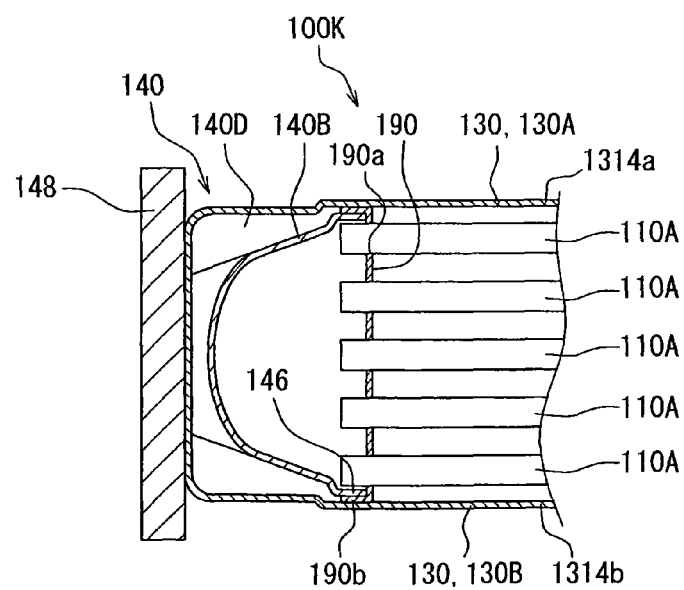
FIG. 23 is a lateral cross-section view illustrating the EGR gas cooler of the eleventh embodiment.

As shown in FIG. 22, the plate 190 is provided on each longitudinal end of the tube 110A. As shown in FIG. 23, the plate 190 made of a rectangular board has a tube hole 190a and a burring 190b. The longitudinal end of the tube 110A is inserted into the tube hole 190a and brazed in this state. The burring 190b is defined by bending an outer periphery of the plate 190 by approximately 90°.

The first water tank 130A and the second water tank 130B are connected in a direction intersecting the tube longitudinal direction at approximately center position of the water tank 130. The intersecting direction corresponds to the tube layering direction.

A face of the water tank 130 to which the water outlet pipe 180 is connected has a recess 139 recessed toward the tube 110A. The recess 139 is located between the water outlet pipe 180 and the water inlet pipe 170. A bottom of the recess 139 is connected to an outer face of the tube 110A. Due to the recess 139, cooling water flowing into the outside space 130E of the water tank 130 through the communication portion 150 can flow entire of the water tank 130 before flowing out of the gas cooler 100K through the water outlet pipe 180.

Figure 21:
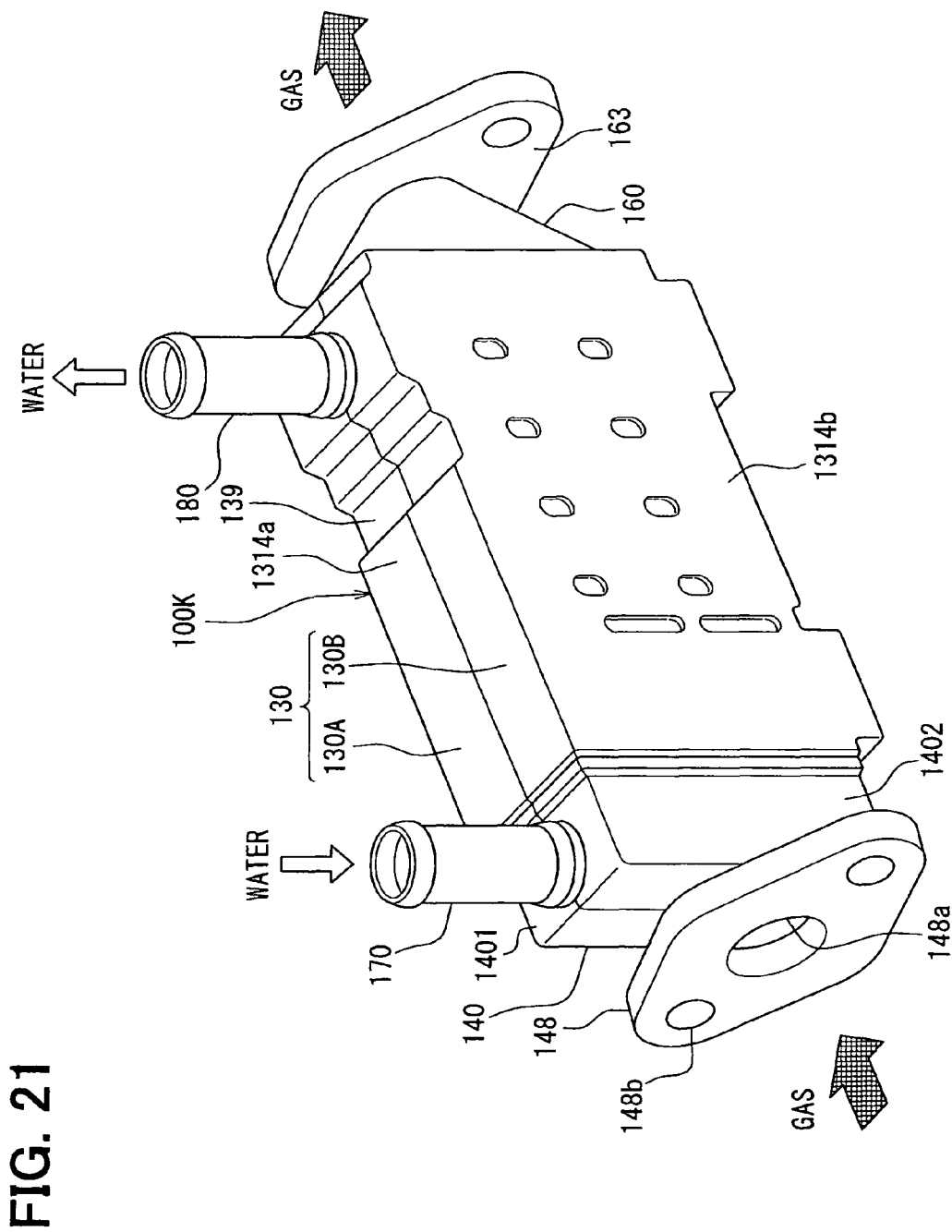
FIG. 21 is a perspective view illustrating an EGR gas cooler according to an eleventh embodiment.

As shown in FIG. 21, the inlet gas tank 140 is constructed by a first tank 1401 and a second tank 1402. The first tank 1401 and the second tank 1402 are connected with each other in the intersecting direction at an approximately center position of the gas tank 140.

The first water tank 130A and the first tank 1401 of the gas tank 140 are integrated with each other into an integration tank 1314a. The second water tank 130B and the second tank 1402 of the gas tank 140 are integrated with each other into an integration tank 1314b.

Outer peripheries of the tanks 1314a, 1314b are brazed with each other. Alternatively, each periphery may have a burring, and the burring of the tank 1314a and the burring of the tank 1314b are brazed with each other. In this case, one of the burrings has plural nails, and the nails are bent to cover the other burring. The brazing is performed in this temporally-fixed state.

As shown in FIG. 23, an outer periphery of the opening 146 of the inside gas tank 140B is fitted and brazed to an inner periphery of the burring 190b of the plate 190. An outer periphery of the opening 161 of the outlet gas tank 160 is fitted and brazed to an inner periphery of the burring 190b of the plate 190. Further, an inner periphery of the tank 1314a, 1314b is brazed to an outer periphery of the burring 190b of the plate 190.

According to the eleventh embodiment, the plate 190 separates the outside space 130E of the water tank 130 from the exhaust passage 140C. Therefore, a predetermined clearance is respectively defined between the tubes 110A in advance in the eleventh embodiment, while the tubes 110 are directly layered with each other in the first to tenth embodiments. Therefore, a gap is not generated between the tube 110A and each component (ex. the water tank 130 or the gas tank 140), so that quality of the brazing can be maintained high.

Further, the water tank 130 and the outside gas tank 140A are constructed by connecting the integration tanks 1314a, 1314b in the tube layering direction. Therefore, when the tank 130, 140A is brazed to the plate 190, overlap portion between the tanks 130, 140A can be eliminated in the tube layering direction. Thus, a gap is not generated between the water tank 130 and the outside gas tank 140A even if a deviation is generated in dimension accuracy or assembling accuracy, so that quality of the brazing can be maintained high.

Other Embodiments

The communication portion 150, 151 is not limited to be constructed by the expansions 133c, 145. Alternatively, the communication portion 150, 151 may be defined by an original pipe member to connect the outside space 130E to the outside space 140D.

The tube 110, 110A is not limited to be constructed by the two plates. Alternatively, the tube 110, 110A may be defined by a simple pipe member. The cross-section shape of the tube 110, 110A is not limited to the flat rectangle. Alternatively, the tube 110, 110A may have an circular cross-section.

The water tank 130 is not limited to be constructed by the first tank 130A and the second tank 130B. Alternatively, the water tank 130 may be defined by a simple pipe member.

The cooling fluid of the gas cooler 100A-100K is not limited to the cooling water of the engine. Alternatively, the cooling fluid may be cooling water of a cooling water circuit other than the engine, such as a circuit including a sub-radiator and original pump.

The exhaust heat exchanger is not limited to the EGR gas cooler 100A-100K. The exhaust heat exchanger may be applied to other heat exchanger, for example, a heat-recovery heat exchanger to heat cooling water by exchanging heat between gas exhausted to outside and the cooling water.

Such changes and modifications are to be understood as being within the scope of the present invention as defined by the appended claims.

What is claimed is:

1. An exhaust heat exchanger comprising:
 a tube through which gas exhausted from an engine passes;
 a water tank to accommodate the tube, the water tank having an outside space located outside of the tube, heat being exchanged between cooling fluid passing through the outside space of the water tank and the exhaust gas passing through the tube;
 a flange to which an exhaust pipe of the engine is to be connected;
 a gas tank having dual structure constructed by
  an exhaust passage through which the exhaust gas passes, the exhaust passage having a first opening part connected to an open end portion of the water tank, and a second opening part to which the flange is fixed, and
  an outside space located outside of the exhaust passage;
 a dividing portion to separate the outside space of the water tank from the exhaust passage of the gas tank, the exhaust passage communicating with an inside of the tube through the dividing portion; and
 a communication portion through which the outside space of the gas tank and the outside space of the water tank communicate with each other; wherein
 the open end portion of the water tank has a water tank expansion expanded outward,
 the gas tank has an outer wall defining a part of the outside space of the gas tank, the outer wall being located adjacent to the first opening part,
 the outer wall has a gas tank expansion expanded outward, the gas tank expansion communicating with the outside space of the water tank, and
 the communication portion is defined by the water tank expansion and the gas tank expansion connected with each other.

2. The exhaust heat exchanger according to claim 1, wherein
the gas tank has a fluid inlet portion through which the cooling fluid flows into the gas tank.

3. The exhaust heat exchanger according to claim 2, wherein
the second opening part has an axis approximately parallel with an axis of the first opening part,
the fluid inlet portion is located on an outer periphery of the gas tank defining the first opening part, and
the communication portion is located on the outer periphery of the gas tank, and opposes to the fluid inlet portion relative to an axis of the gas tank.

4. The exhaust heat exchanger according to claim 2, wherein
the second opening part has an axis extending in a direction intersecting an axis of the first opening part,
the fluid inlet portion has an axis approximately parallel with the axis of the first opening part,
the communication portion is defined at least two positions on an outer periphery of the gas tank defining the first opening part, and
the two positions are located to oppose to each other relative to an axis of the gas tank.

5. The exhaust heat exchanger according to claim 2, wherein
the second opening part has an axis approximately parallel with an axis of the first opening part,
the fluid inlet portion is located on an outer periphery of the gas tank defining the first opening part, and is located adjacent to the communication portion, and
the gas tank further has a separator to separate the outside space of the gas tank into a first section adjacent to the fluid inlet portion and a second section adjacent to the communication portion.

6. The exhaust heat exchanger according to claim 1, wherein
the water tank has a fluid inlet portion through which the cooling fluid flows into the water tank.

7. The exhaust heat exchanger according to claim 6, wherein
the communication portion is defined at least two positions on an outer periphery of the water tank defining the open end portion,
the two positions are located to oppose to each other relative to an axis of the water tank, and
one of the positions is located adjacent to the fluid inlet portion.

8. The exhaust heat exchanger according to claim 1, wherein
the gas tank has an inside tank and an outside tank located outside of the inside tank, and
the inside tank and the outside tank are connected with each other.

9. The exhaust heat exchanger according to claim 1, wherein
the cooling fluid flows from the outside space of the gas tank through the communication portion to the outside space of the water tank in a fluid flowing direction, and
the communication portion has a deflector on a downstream end portion in the fluid flowing direction in a manner that the fluid flowing direction is changed to a direction intersecting a longitudinal direction of the tube.

10. The exhaust heat exchanger according to claim 1, wherein
the cooling fluid flows from the communication portion through the outside space of the water tank, and
the tube has a deflection rib on a surface in a manner that a part of the cooling fluid of the outside space of the water tank flows toward the gas tank.

11. The exhaust heat exchanger according to claim 1, wherein
the gas tank has a flat part located around the second opening part,
the flat part extends approximately perpendicular to an axis of the second opening part, and
the flange is connected to the flat part.

12. The exhaust heat exchanger according to claim 1, wherein
the flange has a communication hole communicating with the second opening part, and
the communication hole has a sacrifice corrosion layer defined on an inner face of the communication hole.

13. The exhaust heat exchanger according to claim 1, wherein
the tube has a flat rectangular cross-section, and is one of a plurality of tubes layered with each other in a tube layering direction, in a manner that long sides of the flat rectangular cross-section oppose to each other in the tube layering direction,
each of the tubes has a projection projected from a base surface of the tube,
the projection is entirely located on end portions of the tube in the tube longitudinal direction, and
the dividing portion is defined by connecting the projections of the tubes with each other.

14. The exhaust heat exchanger according to claim 13, further comprising:
an L-shape board member having an L-shape cross-section constructed by a first face part and a second face part, wherein
the water tank is constructed by a first tank and a second tank connected with each other in the tube layering direction,
the first opening part has a rectangular shape, and has a bent part extending from one side of the rectangular shape in the tube layering direction, and
the board member is interposed between the water tank and the gas tank,
the first face part contacts an inner wall of the water tank, and the second face part contacts the bent part.

15. The exhaust heat exchanger according to claim 13, wherein
the gas tank has an inside tank and an outside tank located outside of the inside tank,
the outside tank of the gas tank has a first tank and a second tank connected in a direction intersecting the tube longitudinal direction so as to absorb a dimension change of the layered tubes in the tube layering direction,
the water tank has a first tank and a second tank connected in the intersecting direction so as to absorb a dimension change of the layered tubes in the tube layering direction, and
the second tank of the outside tank of the gas tank and the second tank of the water tank are integrated with each other into an integration tank.

16. The exhaust heat exchanger according to claim 1, wherein
the dividing portion is made of a plate member,
the tube has an end portion in a tube longitudinal direction, and the end portion of the tube passes through the plate member.

17. The exhaust heat exchanger according to claim 16, wherein
the gas tank has an inside tank and an outside tank located outside of the inside tank,
the outside tank of the gas tank has a first tank and a second tank connected in a direction intersecting the tube longitudinal direction,
the water tank has a first tank and a second tank connected in the intersecting direction,
the first tank of the outside tank of the gas tank and the first tank of the water tank are integrated with each other into an integration tank, and
the second tank of the outside tank of the gas tank and the second tank of the water tank are integrated with each other into an integration tank.

18. The exhaust heat exchanger according to claim 1, wherein
the exhaust gas is recirculatedly supplied to an intake side of the engine, and
the cooling fluid is water to cool the engine.

19. An exhaust heat exchanger comprising:
a tube through which gas exhausted from an engine passes;
a water tank to accommodate the tube, the water tank having an outside space located outside of the tube, heat being exchanged between cooling fluid passing through the outside space of the water tank and the exhaust gas passing through the tube;
a flange to which an exhaust pipe of the engine is to be connected;
a gas tank having dual structure constructed by
an exhaust passage through which the exhaust gas passes, the exhaust passage having a first opening part connected to an open end portion of the water tank, and a second opening part to which the flange is fixed, and
an outside space located outside of the exhaust passage;
a dividing portion to separate the outside space of the water tank from the exhaust passage of the gas tank, the exhaust passage communicating with inside of the tube through the dividing portion; and
a communication portion through which the outside space of the gas tank and the outside space of the water tank communicate with each other, wherein
the gas tank has a fluid inlet portion communicated with the outside space of the gas tank, the cooling fluid flowing into the outside space of the gas tank through the fluid inlet portion, all of the cooling fluid being supplied to the outside space of the gas tank,
the tube has a flat rectangular cross-section, and is one of a plurality of tubes layered with each other in a tube layering direction, in a manner that long sides of the flat rectangular cross-section oppose to each other in the tube layering direction,
the communication portion causes the cooling fluid to flow from the outside space of the gas tank into the outside space of the water tank in a direction perpendicular to the tube layering direction and a longitudinal direction of the tube,
the gas tank has an inside tank and an outside tank located outside of the inside tank, and
the inside tank and the outside tank are connected with each other by overlapping with each other on a side adjacent to the fluid inlet portion and both sides in the tube layering direction.

20. The exhaust heat exchanger according to claim 19, wherein
the second opening part has an axis approximately parallel with an axis of the first opening part,
the fluid inlet portion is located on an outer periphery of the gas tank defining the first opening part, and
the communication portion is located on the outer periphery of the gas tank, and opposes to the fluid inlet portion relative to an axis of the gas tank.

21. The exhaust heat exchanger according to claim 19, wherein
the cooling fluid flows from the outside space of the gas tank through the communication portion to the outside space of the water tank in a fluid flowing direction, and
the communication portion has a deflector on a downstream end portion in the fluid flowing direction in a manner that the fluid flowing direction is changed to a direction intersecting the longitudinal direction of the tube.

22. The exhaust heat exchanger according to claim 19, wherein
the cooling fluid flows from the communication portion through the outside space of the water tank, and
the tube has a deflection rib on a surface in a manner that a part of the cooling fluid of the outside space of the water tank flows toward the gas tank.

23. The exhaust heat exchanger according to claim 19, wherein the exhaust heat exchanger is made of stainless steel,
the second opening part has an axis approximately parallel with an axis of the first opening part,
the fluid inlet portion is located on an outer periphery of the gas tank defining the first opening part, and is located adjacent to the communication portion, and
the gas tank further has a separator to separate the outside space of the gas tank into a first section adjacent to the fluid inlet portion and a second section adjacent to the communication portion.

24. An exhaust heat exchanger comprising:
a tube through which gas exhausted from an engine passes;
a water tank to accommodate the tube, the water tank having an outside space located outside of the tube, heat being exchanged between cooling fluid passing through the outside space of the water tank and the exhaust gas passing through the tube;
a flange to which an exhaust pipe of the engine is to be connected;
a gas tank having dual structure constructed by
an exhaust passage through which the exhaust gas passes, the exhaust passage having a first opening part connected to an open end portion of the water tank, and a second opening part to which the flange is fixed, and
an outside space located outside of the exhaust passage;
a dividing portion to separate the outside space of the water tank from the exhaust passage of the gas tank, the exhaust passage communicating with inside of the tube through the dividing portion; and
the gas tank has a fluid inlet portion communicated with the outside space of the gas tank, the cooling fluid flowing into the outside space of the gas tank through the fluid inlet portion, all of the cooling fluid being supplied to the outside space of the gas tank,
the second opening part has an axis approximately parallel with an axis of the first opening part,
the fluid inlet portion is located on an outer periphery of the gas tank defining the first opening part, and is located adjacent to the communication portion, and the gas tank further has a separator to separate the outside space of the gas tank into a first section adjacent to the fluid inlet portion and a second section adjacent to the communication portion.

* * * * *